United States Patent
Yasui et al.

(10) Patent No.: US 10,837,906 B2
(45) Date of Patent: Nov. 17, 2020

(54) MEASUREMENT DEVICE AND IRRADIATION DEVICE

(71) Applicant: JAPAN SCIENCE AND TECHNOLOGY AGENCY, Saitama (JP)

(72) Inventors: Takeshi Yasui, Tokushima (JP); Tetsuo Iwata, Tokushima (JP); Yasuhiro Mizutani, Osaka (JP); Takeo Minamikawa, Tokushima (JP); Takahiko Mizuno, Tokushima (JP); Eiji Hase, Tokushima (JP); Hirotsugu Yamamoto, Utsunomiya (JP)

(73) Assignee: JAPAN SCIENCE AND TECHNOLOGY AGENCY, Saitama (JP)

( * ) Notice: Subject to any disclaimer, the term of this patent is extended or adjusted under 35 U.S.C. 154(b) by 0 days.

(21) Appl. No.: 16/637,011

(22) PCT Filed: Aug. 9, 2018

(86) PCT No.: PCT/JP2018/029924
§ 371 (c)(1),
(2) Date: Feb. 6, 2020

(87) PCT Pub. No.: WO2019/031584
PCT Pub. Date: Feb. 14, 2019

(65) Prior Publication Data
US 2020/0166457 A1    May 28, 2020

(30) Foreign Application Priority Data
Aug. 9, 2017   (JP) .................. 2017-154392

(51) Int. Cl.
*G01J 3/02* (2006.01)
*G01N 21/64* (2006.01)
*G02B 21/06* (2006.01)

(52) U.S. Cl.
CPC ..... *G01N 21/6428* (2013.01); *G01N 21/6458* (2013.01); *G02B 21/06* (2013.01)

(58) Field of Classification Search
CPC .......... G01N 21/6428; G01N 21/6458; G01N 21/64; G02B 21/06; G01J 3/28; G01J 3/26; G01J 3/02; G01J 3/00
See application file for complete search history.

(56) References Cited

U.S. PATENT DOCUMENTS

| 2011/0049337 A1* | 3/2011 | Taira .................. G02B 27/0944 250/216 |
| 2017/0059408 A1 | 3/2017 | Korner et al. |

FOREIGN PATENT DOCUMENTS

| JP | 2009293994 A | 12/2009 |
| JP | 2012103379 A | 5/2012 |
| WO | 2017002535 A1 | 1/2017 |

OTHER PUBLICATIONS

Japan Patent Office, "International Search Report for PCT Application No. PCT/JP2018/029924", Japan, dated Nov. 13, 2018.

(Continued)

*Primary Examiner* — Abdullahi Nur
(74) *Attorney, Agent, or Firm* — Tim Tingkang Xia, Esq.; Locke Lord LLP

(57) ABSTRACT

According to the present invention, a measurement device includes a light emitting part configured to emit a plurality of spectral lights each including two or more spectra distributed at mutually different frequencies by causing adjacent frequency intervals to be different from each other, a focusing part configured to focus light by causing two or more spectra to overlap in an overlapping region in each of (Continued)

a plurality of different focal point regions of a sample and to be shifted from each other, and a detecting part configured to acquire a signal of fluorescence beats which emits light by interference light beats in each of a plurality of overlapping regions in the sample and includes information of the sample.

16 Claims, 15 Drawing Sheets

(56) References Cited

OTHER PUBLICATIONS

Hiroyuki Sasada, "Current Status and Prospect of Optical Frequency Comb Technology", Optics, 41, 9, pp. 460-466, 2012.

* cited by examiner

FIG. 2
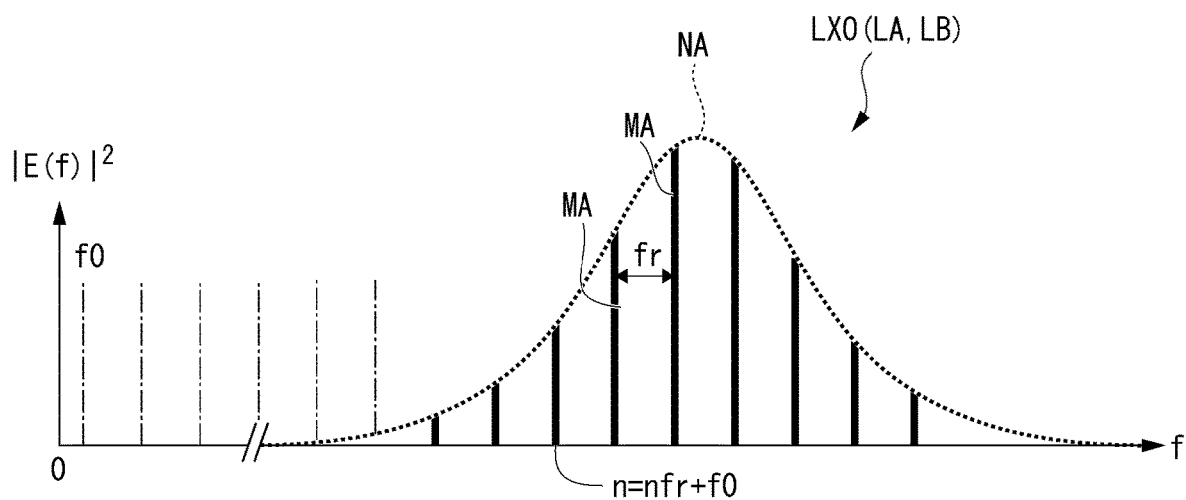
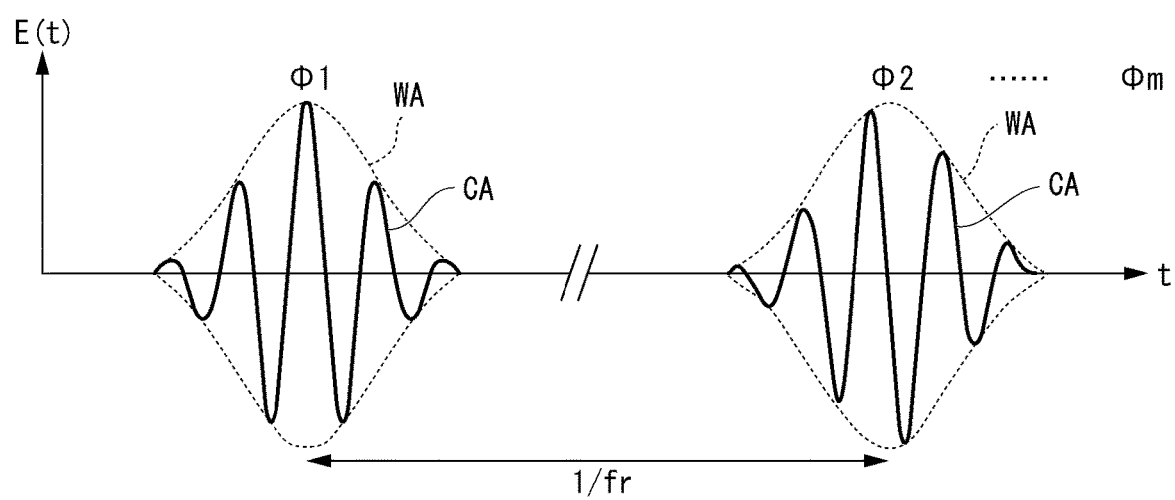

US 10,837,906 B2

MEASUREMENT DEVICE AND IRRADIATION DEVICE

CROSS-REFERENCE TO RELATED PATENT APPLICATION

This application claims priority to Japanese Patent Application No. 2017-154392, filed Aug. 9, 2017, the whole content of which is incorporated herein by reference.

TECHNICAL FIELD

The present invention relates to a measurement device and an irradiation device.

BACKGROUND OF THE INVENTION

Conventionally, a fluorescence microscope equipped with a confocal optical system (hereinafter referred to as a confocal fluorescence microscope) is known as an optical microscope capable of performing fluorescence imaging (for example, see Patent Document 1).

In a normal optical microscope, a predetermined range of a sample is uniformly irradiated with light. On the other hand, in a confocal optical system, irradiation light emitted from a point light source is focused at one point on the sample by an objective lens. As the irradiation light, laser light having excellent monochromaticity and straightness is used. Also, in the confocal optical system, the pinhole is disposed at a position conjugate to the focal position of the objective lens and therefore only the fluorescence at a position where the sample is focused passes through the pinhole and is detected.

In this manner, in the confocal optical system, the irradiation light is first focused at one point on the sample and the fluorescence from a focal position of the sample passes through the pinhole, whereas the fluorescence from a position other than the focal position is cut out by the pinhole. Accordingly, in the confocal optical system, as compared with a normal optical microscope, the contrast is improved without being affected by stray light from a horizontal side adjacent to a focal point and from a front side and a rear side with respect to a focal plane. As a result, because only information of the focal position of the irradiation light is detected, three-dimensional spatial resolution is provided.

For example, confocal fluorescence microscopes capable of forming clear three-dimensional images as described above are used in many fields including a biotechnology field for the analysis of biological functions using fluorescent proteins and the like. Also, the importance of confocal fluorescence microscopy is expected to increase in the future because of high resolution and quantitative properties.

On the other hand, the confocal fluorescence microscope can only obtain point information of the focal position. Thus, in the confocal fluorescence microscope, it is necessary to relatively scan a focal position of the irradiation light emitted from the point light source inside the sample so that two-dimensional information within a sample surface is imaged. For example, a galvano mirror is known as a scanning device capable of scanning the focal position of irradiation light relatively with respect to a sample as described above. However, even if these scanning devices are used, a process of scanning a wide range at a high speed takes time.

As technology for coping with the above-described situation, a measurement device for causing a discrete spectrum emitted by a point light source to be two-dimensionally dispersed with respect to a measurement sample for each spectrum and acquiring mode-resolved spectra corresponding to measurement points of the measurement sample at one time is disclosed in, for example, Patent Document 2. This measurement device obtains information of a sample by associating position information of a spectrum incident on the sample with a frequency of the spectrum. Thus, an image can be formed without scanning the two-dimensional information within the sample surface.

LISTING OF CITATIONS

Patent Document 1: Japanese Unexamined Patent Application, First Publication No. 2012-103379
Patent Document 2: PCT International Publication No. WO2017/002535.

SUMMARY OF THE INVENTION

Technical Problem

The measurement device described in Patent Document 2 can simultaneously measure two-dimensional information without scanning. Thus, phenomena occurring in cells and the like can be simultaneously observed in real time in a biotechnology field of vital function analysis or the like. Also, even when the measurement region is enlarged, information of the sample can be measured in a short time when the above-described measurement device is used. On the other hand, because this measurement device forms an image using transmitted laser light or reflected laser light, it is not possible to acquire a fluorescence image.

The present invention has been made to solve the above-described problems, and an objective of the present invention is to provide a measurement device capable of acquiring a fluorescence image of a sample at a high speed. Also, another objective of the present invention is to provide an irradiation device for irradiating a sample with light under predetermined conditions and enabling measurement using the measurement device.

Solution to Problem

According to a first aspect, there is provided a measurement device including a plurality of light sources configured to each emit spectral light including two or more spectra distributed at mutually different frequencies, wherein adjacent frequency intervals that are frequency intervals of adjacent spectra of the spectral light are mutually different, a dispersing part configured to disperse a plurality of spectral lights emitted from the plurality of light sources in mutually different directions according to each spectrum, a focusing part configured to focus the spectra specific to the light sources dispersed by the dispersing part at a plurality of different focal points on a sample and cause a plurality of focal points according to one light source to overlap a plurality of focal points according to another light source, a spatial filtering part configured to focus fluorescence beats including information of the sample on which light is focused by the focusing part and which emits light by interference light beats in each of a plurality of overlapping portions where the focal points on the sample overlap at positions conjugate to the overlapping portions and perform spatial filtering on the fluorescence beats, and a detecting part configured to acquire a signal of modulated fluorescence beats on which the spatial filtering has been performed by the spatial filtering part and which has been emitted from the plurality of overlapping portions including the information of the sample.

In the measurement device of the above-described aspect, each of the plurality of light sources may be an optical frequency comb light source configured to emit optical frequency comb spectra in which adjacent frequency intervals which are intervals of frequencies of the spectra adjacent on a frequency axis are equal to each other as the spectral light.

In the measurement device of the above-described aspect, the dispersing part may have a configuration including a dispersing element configured to perform wavelength dispersion on incident light and in which wavelength dispersion on the spectral light emitted from the light source is performed by the dispersing element in a direction differing according to each spectrum.

In the measurement device of the above-described aspect, the plurality of light sources may include at least a first light source configured to emit first spectral light in which a frequency interval of the adjacent spectrum is a first adjacent frequency interval and a second light source configured to emit second spectral light in which a frequency interval of the adjacent spectrum is a second adjacent frequency interval. In the measurement device of the above-described aspect, a frequency interval between closest adjacent spectra may be less than half of the first adjacent frequency interval and half of the second adjacent frequency interval when the first spectral light and the second spectral light are arranged on the same frequency axis.

The measurement device of the above-described aspect may further include a control part configured to control a carrier envelope offset frequency or an adjacent frequency interval of spectral light emitted by at least one light source of the plurality of light sources.

In the measurement device of the above-described aspect, the spatial filtering part may include a spatial optical modulator capable of changing a position of light to be transmitted in accordance with the offset frequency and the adjacent frequency interval of the spectral light controlled by the control part.

According to a second aspect, there is provided an irradiation device including a plurality of light sources configured to each emit spectral light including two or more spectra distributed at mutually different frequencies, wherein adjacent frequency intervals that are frequency intervals of adjacent spectra of the spectral light are mutually different, a dispersing part configured to disperse a plurality of the spectral lights emitted from the plurality of light sources in mutually different directions according to each spectrum, and a focusing part configured to focus the spectra specific to the light sources dispersed by the dispersing part at a plurality of different focal points on a sample and cause a plurality of focal points according to one light source to overlap a plurality of focal points according to another light source.

In the irradiation device of the above-described aspect, the plurality of light sources may include at least a first light source configured to emit first spectral light in which a frequency interval of the adjacent spectrum is a first adjacent frequency interval and a second light source configured to emit second spectral light in which a frequency interval of the adjacent spectrum is a second adjacent frequency interval. In the irradiation device of the above-described aspect, a frequency interval between closest adjacent spectra may be less than half of the first adjacent frequency interval and half of the second adjacent frequency interval when the first spectral light and the second spectral light are arranged on the same frequency axis.

In the irradiation device of the above-described aspect, the plurality of light sources may simultaneously irradiate irradiation light to focal points on a sample. In the irradiation device of the above-described aspect, the irradiation light from the light sources may mutually interfere at the focal points on the sample.

According to a third aspect, there is provided an irradiation device including a first light source configured to emit first light having frequency components of a plurality of frequency values which are discrete, a second light source configured to emit second light having frequency components of a plurality of frequency values which are discrete and different from the first light, and a dispersing and focusing part configured to disperse the first light and the second light and focus the first irradiation light and the second irradiation light so that parts of both a first irradiation region of first irradiation light having a frequency component of a first frequency value according to the first light and a second irradiation region of second irradiation light having a frequency component of a second frequency value according to the second light overlap. The first irradiation light and the second irradiation light are simultaneously irradiated so that a difference between the first frequency value and the second frequency value is less than or equal to a difference between the first frequency value of the first light and a frequency value adjacent thereto.

According to a fourth aspect, there is provided a measurement device including a light emitting part configured to emit a plurality of spectral lights each including two or more spectra distributed at mutually different frequencies, wherein adjacent frequency intervals that are frequency intervals of adjacent spectra in each of the plurality of the spectral lights are mutually different, a dispersing part configured to disperse the plurality of the spectral lights emitted from the light emitting part in mutually different directions according to each spectrum, a focusing part configured to focus the spectra dispersed by the dispersing part at a plurality of different focal points on a sample and cause a plurality of focal points based on one of the spectral lights to overlap a plurality of focal points according to another of the spectral lights, and a detecting part configured to acquire a signal of fluorescence beats including information of the sample on which light is focused by the focusing part and which emits light by interference light beats in each of a plurality of overlapping regions where the focusing points on the sample overlap.

In the measurement device of the above-described aspect, the light emitting part may have a plurality of light sources configured to each emit two of the spectral lights having the adjacent frequency intervals which are mutually different.

The measurement device of the above-described aspect may further include a spatial filtering part configured to focus fluorescence beats including information of the sample on which light is focused by the focusing part and which emits light by interference light beats in each of a plurality of overlapping regions where the focal points on the sample overlap at positions conjugate to the overlapping regions and perform spatial filtering on the fluorescence beats. In the measurement device of the above-described aspect, the detecting part may acquire a signal of the fluorescence beats on which the spatial filtering has been performed in the spatial filtering part.

In the measurement device of the above-described aspect, the detecting part may acquire phase information of the fluorescence beats.

According to a fifth aspect, there is provided an irradiation device including a light emitting part configured to emit spectral light including two or more spectra distributed at mutually different frequencies, wherein adjacent frequency intervals that are frequency intervals of adjacent spectra of the spectral light are different, a dispersing part configured to disperse a plurality of the spectral lights emitted from the light emitting part in mutually different directions according to each spectrum, and a focusing part configured to focus the spectra specific to light sources dispersed by the dispersing part at a plurality of different focal points on a sample and cause a plurality of focal points according to one light source to overlap a plurality of focal points according to another light source.

Advantageous Effects of the Invention

According to the measurement device of the above-described aspect, a fluorescence image of a sample can be acquired at a high speed.

BRIEF DESCRIPTION OF DRAWINGS

FIG. 2 is a schematic diagram showing discrete spectral light.

DESCRIPTION OF EMBODIMENTS OF THE INVENTION

Hereinafter, embodiments of measurement devices to which the present invention is applied will be described with reference to the drawings.

First Embodiment

Figure 1:
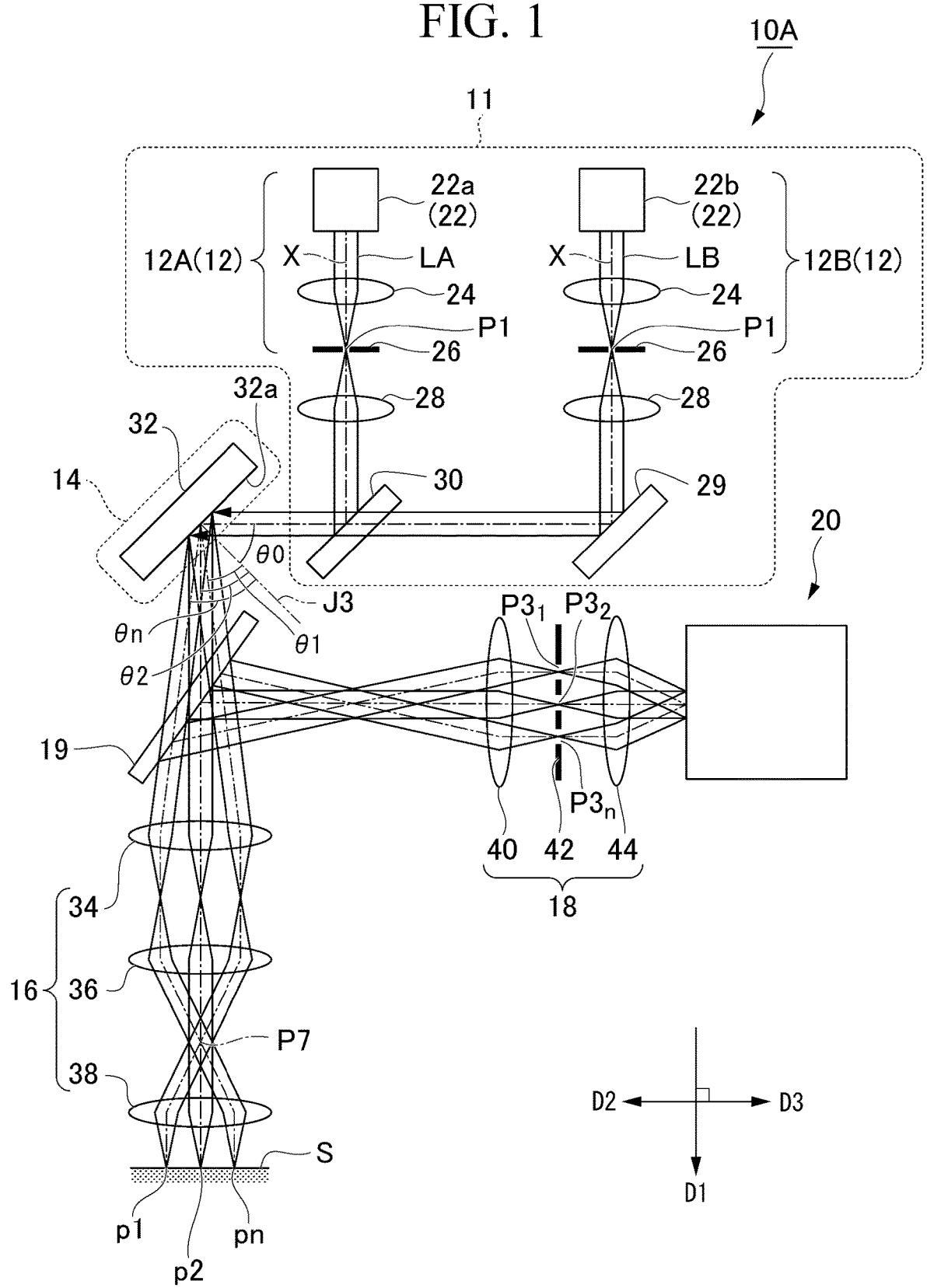
FIG. 1 is a schematic diagram of a measurement device according to a first embodiment.

FIG. 1 is a schematic diagram of a measurement device 10A according to a first embodiment. As shown in FIG. 1, the measurement device 10A includes a light emitting part 11, two point light sources (light sources) 12, a dispersing part 14, a focusing part 16, a separating part 19, a spatial filtering optical system (spatial filtering part) 18, and a detecting part 20.

Light Emitting Part

The measurement device 10A shown in FIG. 1 includes a light emitting part 11 having two point light sources (light sources) 12. Although the number of point light sources 12 is not necessarily limited to two, a case in which the number of point light sources 12 is two will be described in the first embodiment.

Point Light Sources

The two point light sources 12 include a first point light source 12A and a second point light source 12B. The first point light source 12A and the second point light source 12B include a discrete spectral light source (optical frequency comb light source) 22 and a focusing lens 24. The discrete spectral light source (first light source) 22a in the first point light source 12A emits discrete spectral light (spectral light or first spectral light) LA. The discrete spectral light source (second light source) 22b in the second point light source 12B emits discrete spectral light (spectral light or first spectral light) LB.

FIG. 2 is a schematic diagram showing the discrete spectral light LA and LB. In FIG. 2, the number of spectra is reduced for ease of understanding. As shown in FIG. 2, the discrete spectral light LA and LB includes two or more spectra MA distributed at mutually different frequencies.

Such discrete spectral light LA and LB includes a spectrum emitted by an optical frequency comb light source. Hereinafter, the spectrum of the optical frequency comb light source is referred to as an optical frequency comb spectrum LX0. The optical frequency comb spectrum LX0 includes, for example, two or more spectra MA distributed at predetermined frequency intervals from each other on the frequency axis. In FIG. 2, the frequency axis is shown as an f-axis. Hereinafter, the number of spectra MA including a spectrum which does not appear in a measured spectrum (a spectrum indicated by a one-dot chain line in the upper drawing of FIG. 2) is defined as n. An interval between frequencies of spectra MA locates adjacent frequency positions on the frequency axis is referred to as an adjacent frequency interval fr. Looking at frequency characteristics, n spectra MA have a carrier envelope offset frequency f0 and a spectral envelope NA having a distribution of a predetermined light intensity $|E(f)|^2$ and are distributed on the frequency axis. Hereinafter, the carrier envelope offset frequency f0 is simply referred to as an offset frequency f0.

Looking at time characteristics of the optical frequency comb spectrum LX0, a plurality of pulses Φ1, Φ2, ..., Φm are distributed. A time interval between centers of adjacent pulses Φ1, Φ2, ..., Φm is 1/fr. An optical carrier electric field CA of the plurality of pulses Φ1, Φ2, ..., Φm has a time distribution obtained by performing an inverse Fourier transform on a plurality of spectra MA. A pulse envelope WA of the plurality of pulses Φ1, Φ2, ..., Φn has a time distribution obtained by performing an inverse Fourier transform on the spectral envelope NA.

If the offset frequency f0 and the order for the spectrum MA having the offset frequency f0 are determined, the frequency of the spectrum MA in a predetermined order is determined. For example, the frequency vn of an $n^{th}$ spectrum MA is determined with respect to the spectrum MA having the offset frequency f0 as in the following Eq. (1).

$$vn = n \times fr + f0 \qquad (1)$$

In the optical frequency comb spectrum LX0, the adjacent frequency interval fr and the offset frequency f0 are stabilized on the basis of a frequency standard device, and the frequency of the spectrum MA hardly changes on the frequency axis and is fixed. The fact that "the frequency of the spectrum MA hardly changes" indicates a state in which mutually different modes of the plurality of spectra MA are phase-locked and do not change on the frequency axis to the extent that the frequency of the spectrum MA can be achieved by performing phase-locking to the frequency standard device.

Figure 3:
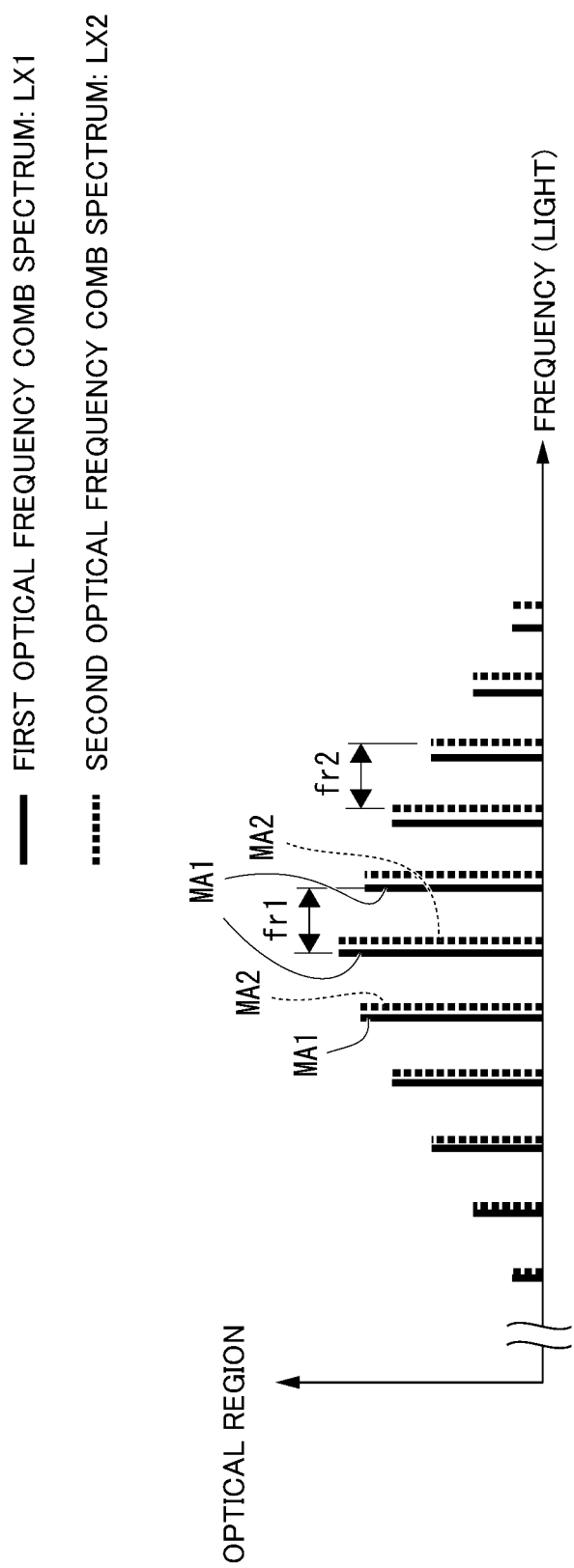
FIG. 3 is a diagram showing a first optical frequency comb spectrum of discrete spectral light emitted by a first point light source and a second optical frequency comb spectrum of discrete spectral light emitted by a second point light source.

The discrete spectral light LA emitted by the first point light source 12A and the discrete spectral light LB emitted by the second point light source 12B have mutually different offset frequencies f0 and mutually different adjacent frequency intervals fr. FIG. 3 is a diagram showing a first optical frequency comb spectrum LX1 of the discrete spectral light LA emitted by the first point light source 12A and a second optical frequency comb spectrum LX2 of the discrete spectral light LB emitted by the second point light source 12B.

As shown in FIG. 3, the optical frequency comb spectra LX1 and LX2, i.e., the discrete spectral lights LA and LB, have n spectra MA1 and MA2 distributed at equal intervals on the frequency axis, respectively. In the first optical frequency comb spectrum LX1, the frequency interval between the spectra MA1 and MA1 whose frequency positions are adjacent on the frequency axis is a first adjacent frequency interval fr1. A plurality of first adjacent frequency intervals fr1 in the first optical frequency comb spectrum LX1 are equal to each other. On the other hand, in the second optical frequency comb spectrum LX2, the frequency interval between the spectra MA2 and MA2 whose frequency positions are adjacent on the frequency axis is a second adjacent frequency interval fr2. A plurality of second adjacent frequency intervals fr2 in the second optical frequency comb spectrum LX2 are equal to each other. The first adjacent frequency interval fr1 and the second adjacent frequency interval fr2 have a difference of a frequency interval Δfr from each other. The frequency interval Δfr is represented by Δfr=fr1−fr2.

As shown in FIG. 3, when the first optical frequency comb spectrum LX1 and the second optical frequency comb spectrum LX2 are arranged on the same frequency axis, the frequency interval between the spectra MA1 and MA2 closest to each other on the frequency axis is represented by mΔfr+fRF. mΔfr+fRF=vn1−vn2=n1×fr1+f01−(n2×fr2+f02). The frequency interval (mΔfr+fRF) is less than half (fr1/2) of the first adjacent frequency interval fr1 and half (fr2/2) of the second adjacent frequency interval fr2. Here, vn1 means the frequency of an $n1^{th}$ spectrum of the first optical frequency comb spectrum LX1. f01 means an offset frequency of the first optical frequency comb spectrum LX1. vn2 means the frequency of an $n2^{th}$ spectrum of the second optical frequency comb spectrum LX2. f02 means an offset frequency of the second optical frequency comb spectrum LX2.

A focusing lens 24 is arranged in an emission direction of each discrete spectral light source 22 (see FIG. 1). The focusing lens 24 focuses the discrete spectral light LA and LB emitted from the discrete spectral light source 22 at a focal position P1. Accordingly, various parameters of the focusing lens 24 are appropriately set in consideration of the frequency vn of the spectra MA1 and MA2, a position of the focusing lens 24, a distance from the focal position P1, and the like, and are not limited to specific values.

Although not shown in FIG. 1, when lenses are used in the optical system of the point light source 12 like the first point light source 12A and the second point light source 12B shown in FIG. 1, the lens may be replaced with a mirror. The mirror may have a curvature. By using the mirror instead of the lenses, it is possible to prevent the chromatic aberration of the lenses from affecting the frequency of each spectrum MA of the optical frequency comb spectrum LX0 emitted from the discrete spectral light source 22.

On the optical axis X, a pinhole element 26 and a collimating lens 28 are disposed in that order in front of the point light source 12.

An aperture of a predetermined size and shape is formed in the pinhole element 26. In a direction along the optical axis X, the aperture of the pinhole element 26 is located at the focal position P1. A size and shape of the aperture formed in the pinhole element 26 are appropriately set in consideration of the frequencies of the spectra MA1 and MA2, desired resolution for acquiring information of the sample S, and the like and the size and shape of the aperture formed in the pinhole element 26 is not limited to a specific size and shape. The pinhole element 26 is provided to form a spatial mode of the laser beam in an ideal shape and to give confocal properties. If sufficient confocal properties can be obtained by the measurement device 10A, the pinhole element 26 may be omitted.

The collimating lens 28 collimates the discrete spectral light LA and LB diverging from the focal position P1. Various parameters of the collimating lens 28 are set in consideration of the frequencies of the spectra MA1 and MA2, the distance between the focal position P1 and the position of the collimating lens 28 and are not limited to specific values.

The pinhole element 26, the focusing lens 24, and the collimating lens 28 may be replaced with other components as long as the discrete spectral light LA and LB can be favorably focused at the focal position P1.

The discrete spectral light LB emitted from the collimating lens 28 is incident on the mirror 29. The discrete spectral light LB reflected by the mirror 29 is incident on the half mirror 30. The discrete spectral light LA emitted from the collimating lens 28 and the discrete spectral light LB reflected by the mirror 29 combine at the half mirror 30 and are incident on the axis J3 of the dispersing element 32 at an angle θ0.

Discrete Spectral Light Source

As the discrete spectral light source 22, a conventional comb light source capable of emitting the optical frequency comb spectrum LX0 described above can be used.

Hereinafter, a configuration example of the discrete spectral light source 22 will be described. Detailed descriptions of conventional components in each configuration example will be omitted. The configuration of the discrete spectral light source 22 is not limited to the following configuration examples.

Figure 4:
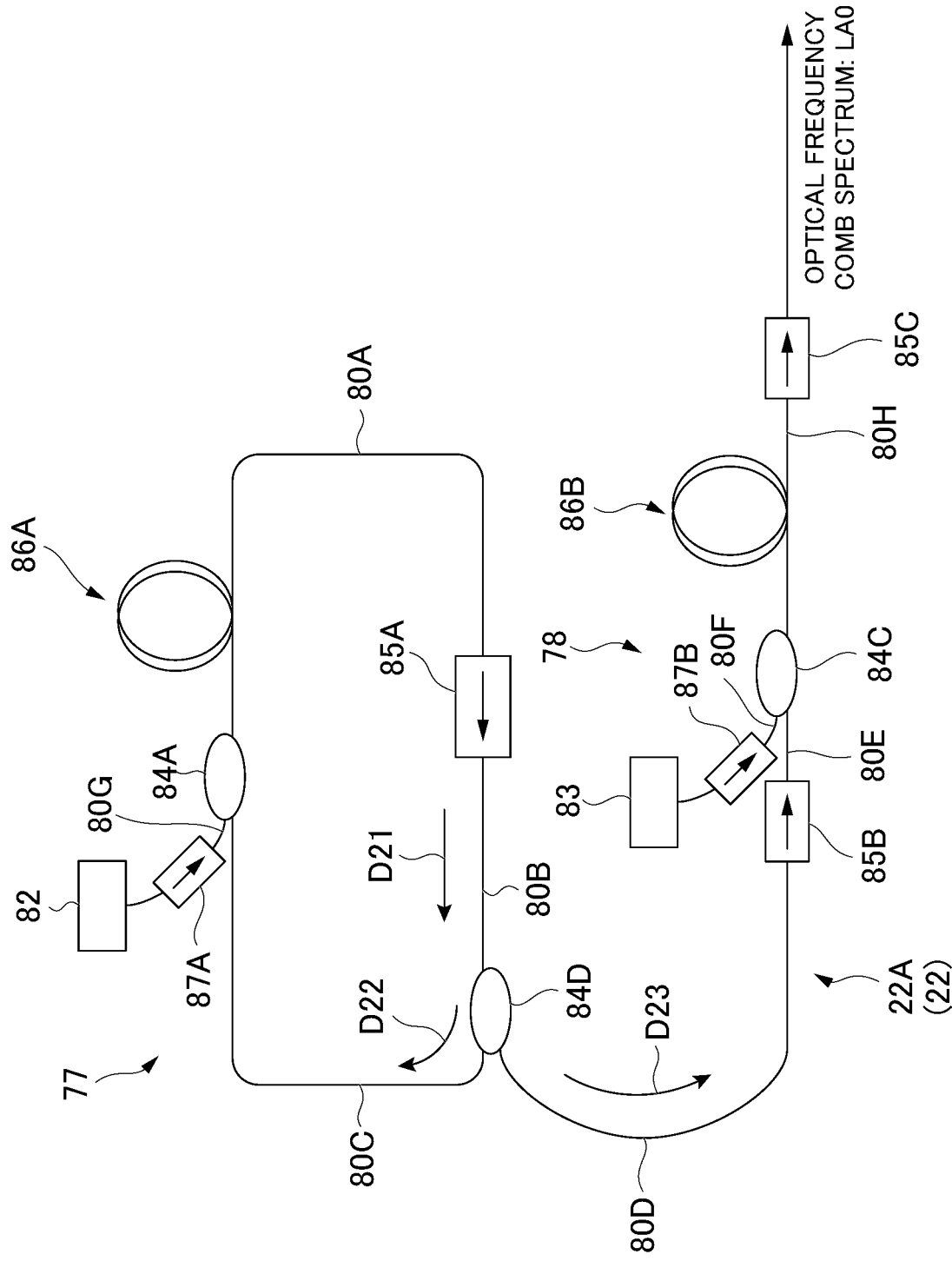
FIG. 4 is a schematic diagram showing a first configuration example of a discrete spectral light source in the measurement device according to the first embodiment.

FIG. 4 is a schematic diagram of a comb light source 22A which is a first configuration example of the discrete spectral light source 22. As shown in FIG. 4, the comb light source 22A includes a mode-locked fiber laser 77 and an amplifier 78.

The mode-locked fiber laser 77 includes an excitation semiconductor laser 82, an optical fiber 80G having an optical isolator 87A, an optical coupler 84A, an optical fiber 80A, optical fibers 80B and 80C, and an optical isolator 85A. The optical fiber 80A includes an optical amplification fiber 86A to which a rare earth element (erbium, ytterbium, or the like) is doped.

The amplifier 78 is connected to the mode-locked fiber laser 77 via an optical coupler 84D disposed between the optical fibers 80B and 80C. The amplifier 78 includes an optical fiber 80D, an optical isolator 85B, an optical fiber 80E, an excitation semiconductor laser 83, an optical fiber 80F having an optical isolator 87B, an optical coupler 84C, an optical fiber 80H, and an optical isolator 85C. The optical fiber 80D is connected to an output side of the optical coupler 84D. The optical fiber 80H includes an optical amplification fiber 86B to which a rare earth element (erbium, ytterbium, or the like) is doped.

In the mode-locked fiber laser 77 shown in FIG. 4, pulses having high frequency stability oscillate from the optical isolator 85A toward the optical coupler 84A. Some of the pulses that have oscillated are separated from the optical coupler 84D to the optical fiber 80D, propagate in the optical fiber 80D, and are amplified by the amplifier 78. On the other hand, the remaining pulses that have oscillated propagate in the optical fiber 80C and loop inside the mode-locked fiber laser 77. According to such an operation principle, the optical frequency comb spectrum LX0 which is a high-power optical frequency comb is emitted from the optical isolator 85C.

Figure 5:
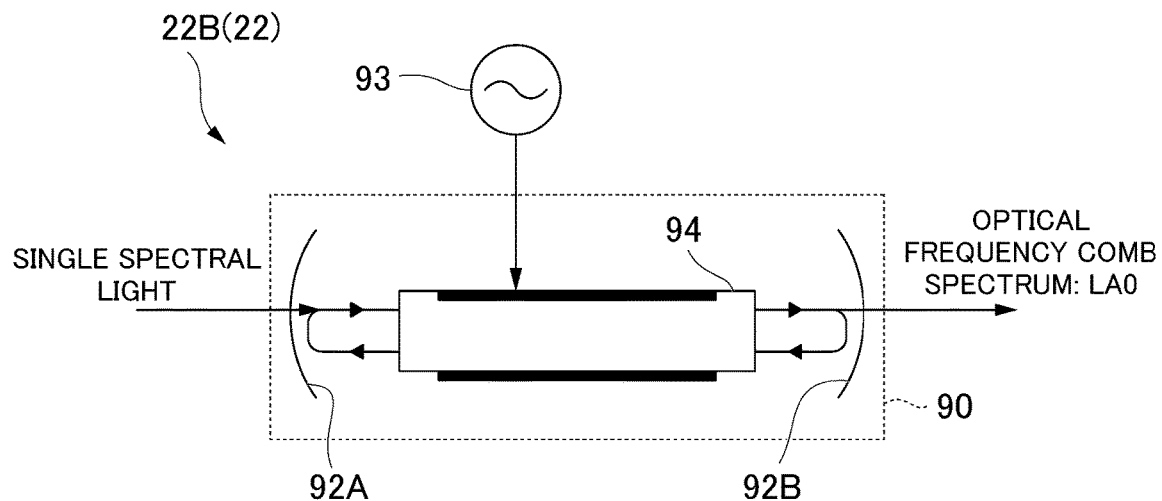
FIG. 5 is a schematic diagram showing a second configuration example of the discrete spectral light source in the measurement device according to the first embodiment.

FIG. 5 is a schematic diagram of a comb light source 22B which is a second configuration example of the discrete spectral light source 22. As shown in FIG. 5, the comb light source 22B includes an optical modulator 90 and a microwave oscillator 93. The optical modulator 90 includes mirrors 92A and 92B disposed at a predetermined distance from each other and an electro-optic crystal 94 arranged between the two mirrors 92A and 92B. For the electro-optic crystal 94, for example, lithium niobate ($LiNbO_3$) is used.

In the configuration shown in FIG. 5, single spectral light incident on the optical modulator 90 is externally phase-modulated by the microwave oscillator 93. The electro-optic crystal 94 is disposed within a Fabry-Perot resonator including the two mirrors 92A and 92B and deep modulation is applied therein. About 1000 or more spectra MA are generated by applying modulation in the electro-optic crystal 94. The adjacent frequency interval fr of the spectrum MA matches a modulation frequency of the microwave oscillator 93. Because the optical modulator 90 consists of a passive component, an optical frequency comb spectrum LX0 including two or more spectra MA that are highly stable on the frequency axis is generated. A center frequency of the spectral envelope NA is determined on the basis of a center frequency of light emitted from an input light source (not shown).

Figure 6:
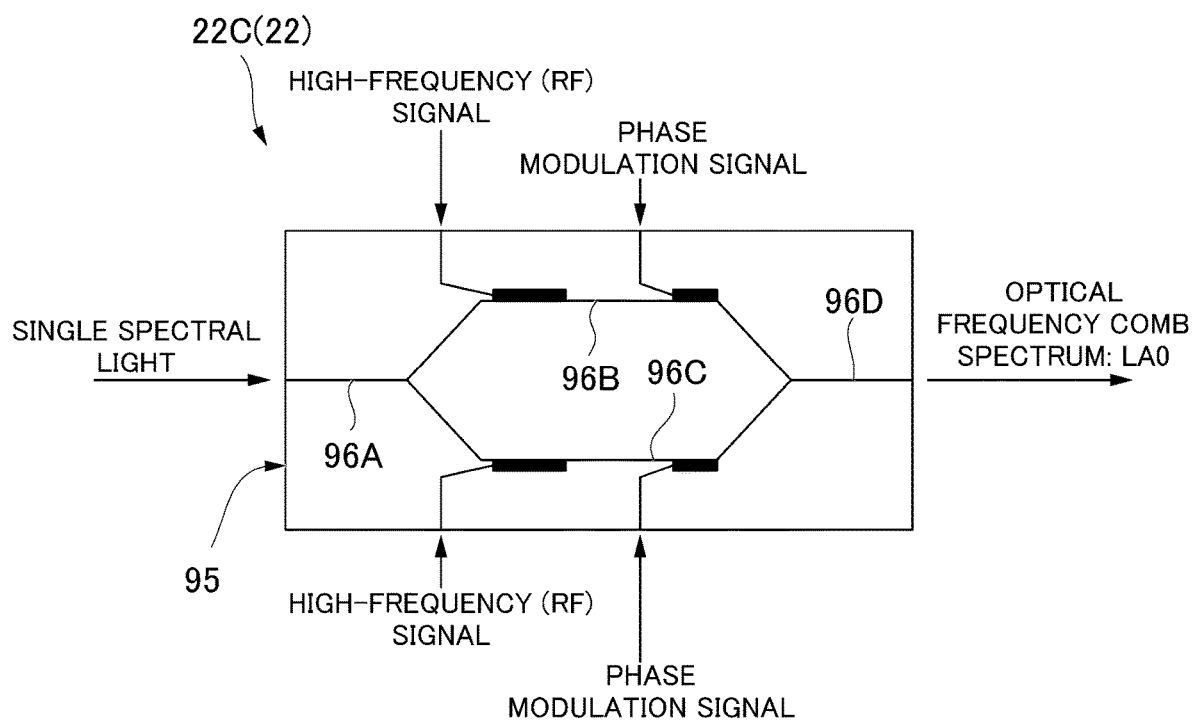
FIG. 6 is a schematic diagram showing a third configuration example of the discrete spectral light source in the measurement device according to the first embodiment.

FIG. 6 is a schematic diagram of a comb light source 22C which is a third configuration example of the discrete spectral light source 22. As shown in FIG. 6, the comb light source 22C includes a Mach-Zehnder modulator (MZM) type ultra-flat optical comb generator (MZ-FCG) 95 of a waveguide type. The MZ-FCG 95 has an input waveguide 96A, two branch waveguides 96B and 96C, and an output waveguide 96D. A waveguide that can input a high-frequency (RF) signal is coupled to the branch waveguide 96B. A waveguide that can input a phase modulation signal is coupled to the branch waveguide 96C.

In the configuration shown in FIG. 6, when an RF signal is input to the two branch waveguides 96B and 96C under predetermined conditions, two optical frequency comb spectra are generated from a single spectrum by the branch waveguides 96B and 96C. At a coupling position of the two branch waveguides 96B and 96C, the imbalance in light intensities of the two optical frequency comb spectra is mutually compensated for. Accordingly, an optical frequency comb spectrum LX0 having excellent flatness of the spectral envelope NA is generated and output from the output waveguide 96D.

Figure 7:
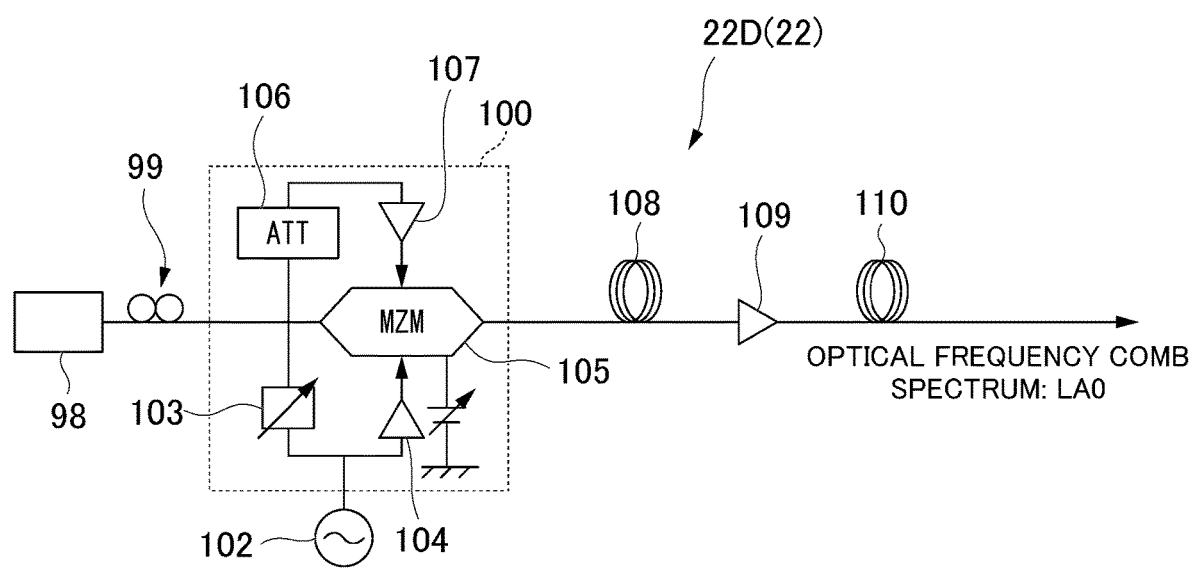
FIG. 7 is a schematic diagram showing a fourth configuration example of the discrete spectral light source in the measurement device according to the first embodiment.

FIG. 7 is a schematic diagram of a comb light source 22D which is a fourth configuration example of the discrete spectral light source 22. The comb light source 22D is a broadband comb and ultra-short pulse light source including the MZ-FCG 95 of the comb light source 22C. As shown in FIG. 7, the comb light source 22D includes an excitation semiconductor laser 98, a polarization controller (PC) 99, an MZM 100, a single mode fiber (SMF) 108, an erbium-doped fiber amplifier 109, a dispersion-flattened dispersion-decreasing fiber (DF-DDF) 110.

In the configuration shown in FIG. 7, an optical comb signal generated by the MZ-FCG 95 is input to the SMF 108 which is conventional and is subsequently input to the DF-DDF, so that an optical frequency comb spectrum LX0 extending to about 20 THz is generated.

Dispersing Part

The dispersing part 14 is disposed between the collimating lens 28 and the focusing part 16 in a direction along the optical axis X. The dispersing part 14 disperses the discrete spectral light LA and LB which incident at an angle θ0 with respect to the axis J3 in mutually different directions for every spectra MA1 and MA2. The dispersing part 14 shown in FIG. 1 includes a dispersing element 32. In FIG. 1, a case where a diffraction grating is used as the dispersing element 32 is shown.

The dispersing element 32 is disposed in a position in which the axis J3 orthogonal to the dispersion surface 32a is inclined by an angle θ0 with respect to the optical axis X. The dispersing element 32 one-dimensionally, two-dimensionally or three-dimensionally performs wavelength dispersion on the light incident at an angle θ0 at angles θ1, θ2, . . . , θn according to the frequencies of n spectra MA1 and MA2. The dispersing element 32 having such a function includes, for example, a diffraction grating, a prism, a virtual imaged phased array (VIPA: registered trademark), a computer generated hologram (CGH), and the like. When a diffraction grating or a prism is used as the dispersing element 32, dispersed beams after the wavelength dispersion are disposed one-dimensionally, i.e., linearly, as shown in FIG. 1.

A pitch of the diffraction grating is set on the basis of a conventional grating equation in consideration of the angle θ0 at which the spectra MA1 and MA2 are incident, the frequencies of the spectra MA1 and MA2, the desired resolution for acquiring information of the sample S, and the like, and is not limited to a specific pitch. When a VIPA and a diffraction grating are used in combination as the dispersing element 32, dispersed beams after the wavelength dispersion are disposed two-dimensionally, i.e., in a plane. When the CGH is used as the dispersing element 32, the depth of the focal position can be changed for each spectrum by giving CGH lens characteristics.

Figure 8:
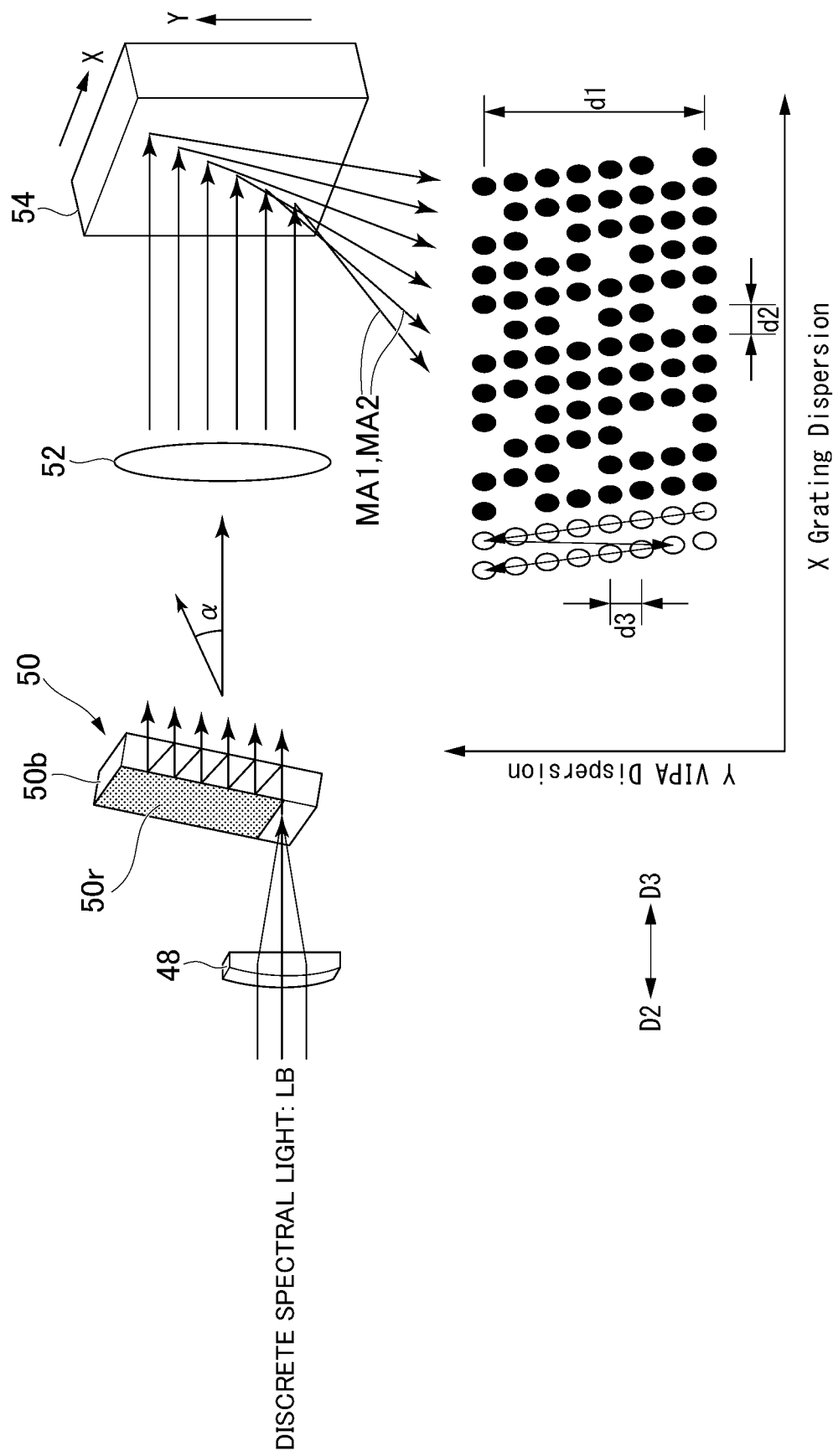
FIG. 8 is a schematic diagram showing a first configuration example of a dispersing part in a case that a VIM and a diffraction grating are used in combination as a dispersing element.

FIG. 8 is a schematic diagram showing a first configuration example of the dispersing part 14 when a VIPA and a diffraction grating are used in combination as the dispersing element 32. The dispersing part 14A shown in FIG. 8 includes a cylindrical lens 48, a VIPA 50, a spherical lens 52, and a diffraction grating 54 as the dispersing element 32. The VIPA 50 includes a thin glass plate 50b. A semi-transmissive film (not shown) is formed on one surface of the glass plate 50b. A reflective film 50r is formed on the other surface. The VIPA 50 has sharp wavelength dispersion characteristics due to an etalon. When the VIPA 50 is moved, a wavelength dispersion angle changes.

In the configuration shown in FIG. 8, first, light converged in one direction (a direction indicated by an arrow X shown in FIG. 8) by the cylindrical lens 48 is further dispersed by the VIPA 50 in a direction indicated by an arrow Y. A dispersion angle of dispersed light is in a range of an angle α with respect to the optical axis. The angle α is determined by a frequency of the discrete spectral light LB, a thickness of the VIPA 50, and an angle of incidence of the discrete spectral light LB on the VIPA 50.

The light dispersed by the VIPA 50 is deflected by the spherical lens 52 in a direction parallel to the optical axis for each light and is incident on the diffraction grating 54. Because a longitudinal direction of the diffraction grating 54 is a direction parallel to the direction of the arrow Y, the light reflected from the diffraction grating 54 is diffracted in a direction orthogonal to the one direction described above (the direction of the arrow X shown in FIG. 8) simultaneously with the reflection and is dispersed for each frequency. Accordingly, the spectra MA1 and MA2 are two-dimensionally expanded in the directions of arrows D2 and D3 and the directions orthogonal to the directions of arrows D1, D2 and D3.

As shown in FIG. 8, a band d1 in which the two-dimensionally expanded spectra MA1 and MA2 are scattered in the direction orthogonal to the directions of the arrows D1, D2 and D3 and a pitch d2 of the spectra MA1 and MA2 in the directions of the arrows D2 and D3 depend upon a free spectrum range (FSR) of the VIPA 50 and a grating pitch of the diffraction grating 54. A pitch d3 in the direction orthogonal to the directions of the arrows D1, D2, and D3 depends on the frequency interval of the spectrum of the discrete spectral light LB incident on the VIPA 50. In the first embodiment, the frequency interval of the spectrum of the discrete spectral light LB is one of the first adjacent frequency interval fr1 and the second adjacent frequency interval fr2.

Focusing Part

As shown in FIG. 1, the focusing part 16 is disposed between the dispersing part 14 and the sample S in a direction along the optical axis X. The focusing part 16 focuses the spectra MA1 and MA2 on which wavelength dispersion has been performed by the dispersing part 14 at mutually different positions p1, p2, . . . , pn on the sample S.

The focusing part 16 includes relay lenses 34 and 36 and an objective lens 38. The relay lenses 34 and 36 are used to transfer a beam emission state of the dispersing element 32 to an entrance pupil (a point P7 shown in FIG. 1) of the objective lens. The relay lens 34 focuses the plurality of spectra MA1 and MA2 at mutually different positions in a direction orthogonal to the optical axis X (for example, the direction of the arrow D2 or the direction of the arrow D3 shown in FIG. 1). The relay lens 36 collimates the plurality of spectra MA1 and MA2 diverging after the focusing and causes the plurality of spectra MA1 and MA2 to commonly pass through the point P7, which is the entrance pupil of the objective lens, and to be incident on the objective lens 38. The objective lens 38 forms a focal point at a different position depending on a beam incidence angle to the point P7. The incident angle differs for every spectra MA1 and MA2. The spectra MA1 and MA2 is focused on the sample S at mutually different positions in the direction of the arrow D2 or D3.

Also, the configuration of the focusing part 16 is not limited to the above-described configuration as long as the spectra MA1 and MA2 dispersed by the dispersing part 14 can be focused at mutually different positions p1, p2, . . . , pn on the sample S to form a focal point region (focal point) C.

Figure 9:
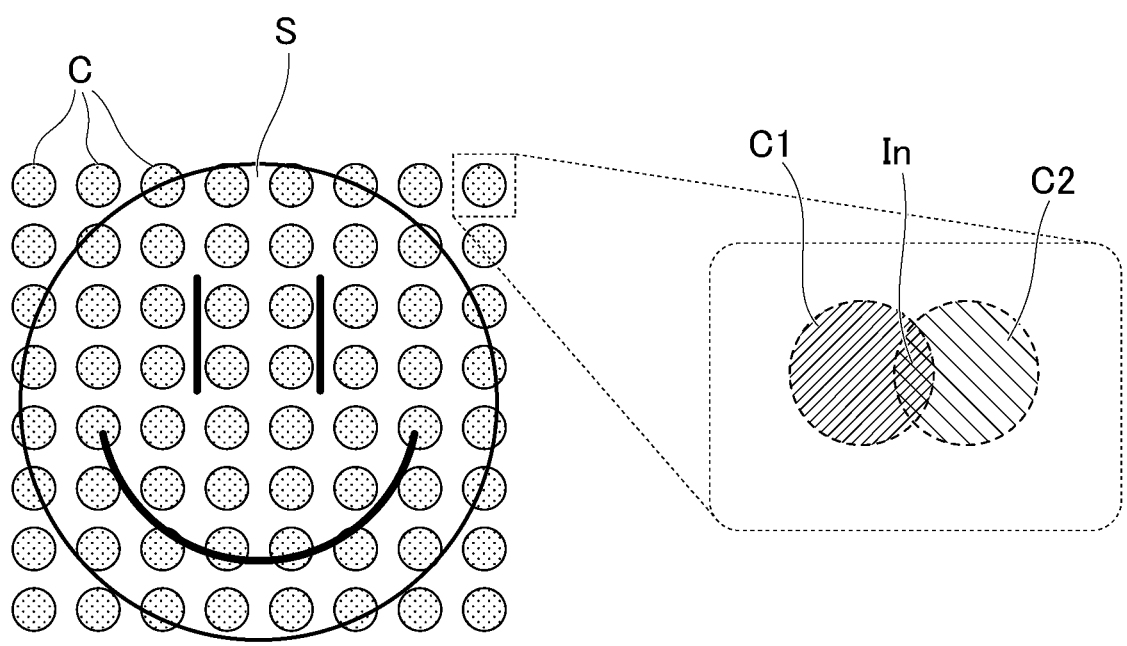
FIG. 9 is a diagram schematically showing focal points two-dimensionally spreading over the surface of a sample by a focusing part.

FIG. 9 is a diagram schematically showing a plurality of focal point regions C that are two-dimensionally expanded on the surface of the sample S by the focusing part 16. Each focal point region C exists in a point shape. FIG. 9 shows an expanded image of the focal point region C when the dispersing part 14A in which the VIM 50 and the diffraction grating 54 shown in FIG. 8 are combined is employed. The focal point regions C are two-dimensionally located. The focal point region C corresponds to each of the positions p1, p2, . . . , pn where light is focused on the sample S in FIG. 1.

The right side of FIG. 9 is an enlarged view of each of the focal point regions C. As shown in FIG. 3, the first optical frequency comb spectrum LX1 irradiated from the first point light source 12A and the second optical frequency comb spectrum LX2 irradiated from the second point light source 12B have adjacent frequency intervals which are mutually different. Thus, as shown on the right side of FIG. 9, the focal positions of the discrete spectral light LA from the first point light source 12A and the discrete spectral light LB from the second point light source 12B are slightly different from each other.

As shown in FIG. 3, when the discrete spectral light LA from the first point light source 12A and the discrete spectral light LB from the second point light source 12B are arranged on the same frequency axis, a frequency interval (mΔfr+fRF) between spectra MA1 and MA2 closest to each other on the frequency axis is represented by $vn1-vn2=(n1 \times fr1+f01)-(n2 \times fr2+f02)$ and is less than half (fr1/2) of the first adjacent frequency interval fr1 and half (fr2/2) of the second adjacent frequency interval. Thus, as shown in FIG. 9, when each of the focal point regions C is enlarged, an image in which the focal point region C1 of the discrete spectral light LA emitted by the first point light source 12A and the focal point region C2 of the discrete spectral light LB emitted by the second point light source 12B partially overlap is shown. In other words, in the focal point regions C, the focal point region C1 and the focal point region C2 are shifted from each other while overlapping in an overlapping region In.

The focusing part 16 focuses the spectra MA1 and MA2 for each point light source 12 dispersed by the dispersing part 14 in a plurality of different focal point regions C1 and C2 of the sample S, respectively. In each focal point region C, a plurality of focal point regions C1 based on the first point light source 12A and a plurality of focal point regions C2 based on the second point light source 12B overlap in the overlapping region In.

In the overlapping region In of the two focal point regions C1 and C2, the discrete spectral light LA and the discrete spectral light LB interfere each other. As a result, an optical electric field in the overlapping region In is modulated by a beat frequency according to a frequency difference between the spectrum MA1 of the discrete spectral light LA and the spectrum MA2 of the discrete spectral light LB. A fluorescence beat is excited and generated by an interference light beat having a modulation frequency corresponding to the beat frequency of the two spectra MA1 and MA2. A frequency of the fluorescence beat becomes the same as a beat frequency of interference light. In other words, a fluorescence beat spectrum having the beat frequencies of the two spectra MA1 and MA2 is generated from the overlapping region In of the two focal point regions C1 and C2. On the other hand, in the focal point region C1 and the focal point region C2 other than the overlapping region In, fluorescence spectra modulated at correspond frequencies of the first adjacent frequency interval fr1 and the second adjacent frequency interval fr2 are generated.

Figure 10:
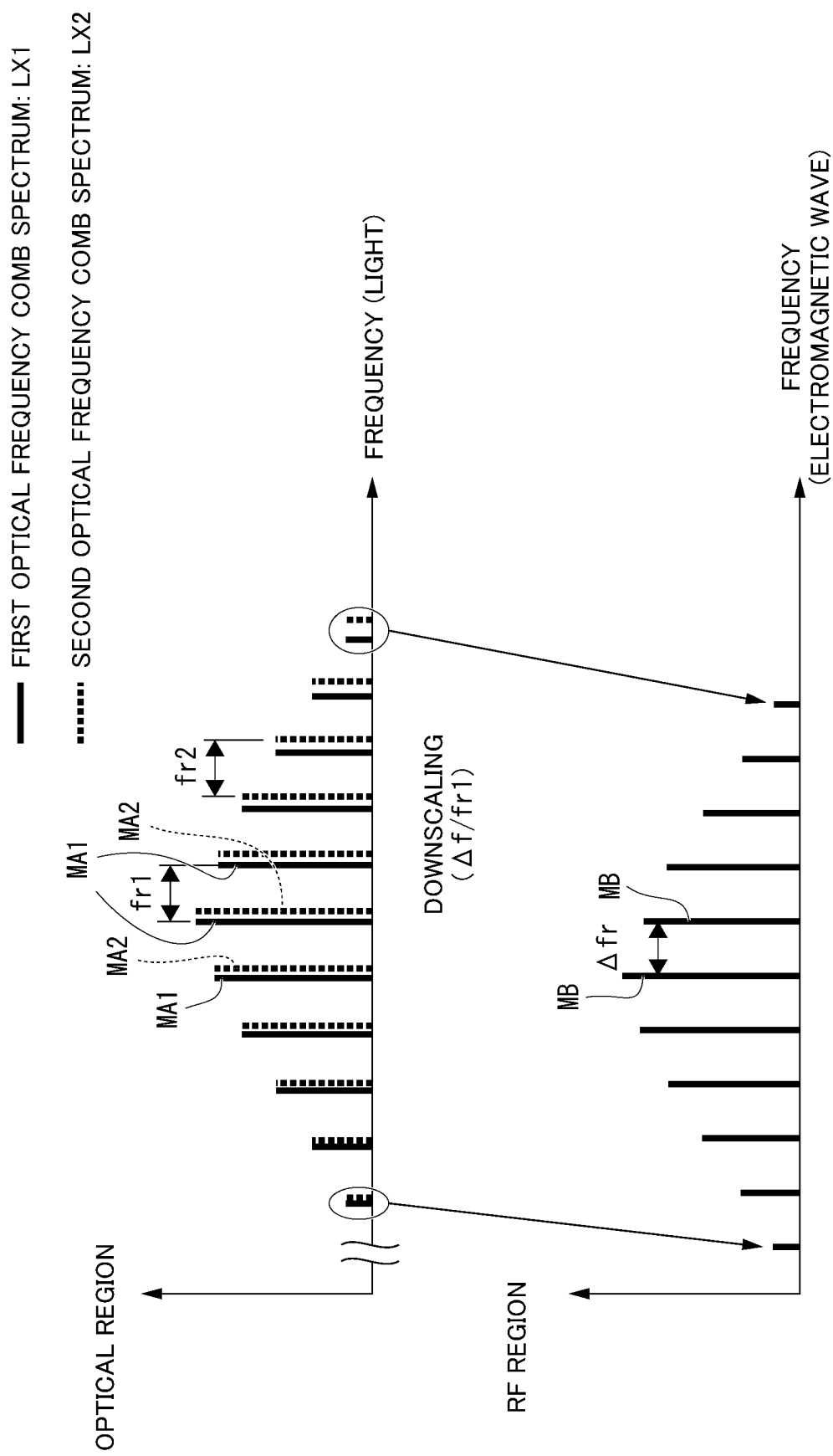
FIG. 10 is a diagram illustrating a process of generating an interference RF spectrum between the first optical frequency comb spectrum and the second optical frequency comb spectrum.

FIG. 10 is a diagram illustrating a process of generating an interference RF spectrum of the first optical frequency comb spectrum LX1 and the second optical frequency comb spectrum LX2. As described above, in the first optical frequency comb spectrum LX1, the frequency interval between the spectra MA1 and MA1 whose frequency positions are adjacent on the frequency axis is the first adjacent frequency interval fr1. The plurality of first adjacent frequency intervals fr1 on the frequency axis are equal to each other. On the other hand, in the second optical frequency comb spectrum LX2, the frequency interval between the spectra MA2 and MA2 whose frequency positions are adjacent on the frequency axis is the second adjacent frequency interval fr2. The plurality of second adjacent frequency intervals fr2 on the frequency axis are also equal to each other. The first adjacent frequency interval fr1 and the second adjacent frequency interval fr2 are mutually different.

Figure 11:
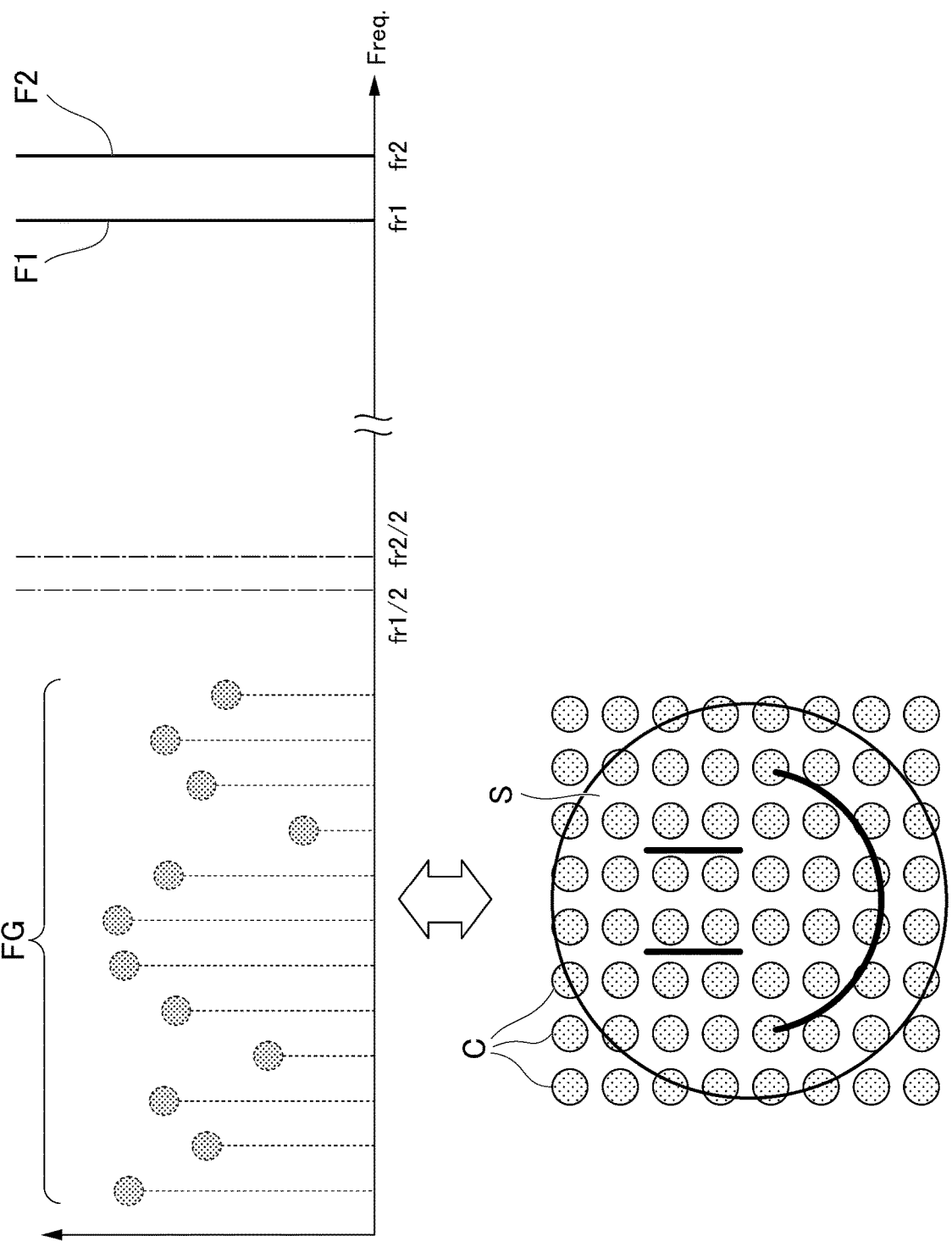
FIG. 11 is a diagram showing a relationship between an overlapping region of a sample and a detected fluorescence beat group spectrum.

Thus, in the interference light, the frequency interval between the spectra MA and MB whose frequency positions are adjacent on the frequency axis in an electromagnetic wave region becomes mΔfr+fRF. The frequency interval (mΔfr+fRF) is represented by vn1−vn2=(n1×fr1+f01)−(n2×fr2+f02). The RF spectrum of the interference light is downscaled with respect to the first optical frequency comb spectrum LX1 and the second optical frequency comb spectrum LX2. A fluorescence beat group spectrum FG having a beat frequency with a frequency interval of Δfr is also obtained from the fluorescence excited and generated by excitation light having such an RF spectrum of the interference light (FIG. 11). As shown in FIG. 11, a frequency of the fluorescence beat group spectrum FG is downscaled as compared with frequencies of fluorescence F1 and F2 generated in a non-overlapping region in the focal point regions (focal points) C1 and C2. The fluorescence beat group spectrum FG has information of each overlapping region In of the sample S. The information of each overlapping region In corresponds to a measurement point when a two-dimensional image is formed from the fluorescence beat group spectrum FG.

The fluorescence beat group spectrum generated from the overlapping region In of the focal point region C1 and the focal point region C2 is distributed in a band of a frequency lower than fr1/2 and fr2/2. On the other hand, fluorescence from a non-overlapping region which does not overlap the focal point region C2 in the focal point region C1 is distributed at the first adjacent frequency interval fr1. Fluorescence from a non-overlapping region which does not overlap the focal point region C1 in the focal point region C2 is distributed at the first adjacent frequency interval fr2. Accordingly, even if a wavelength of the generated fluorescence in the overlapping region In is the same as a wavelength of the generated fluorescence in the non-overlapping region, it is possible to extract the fluorescence only in the overlapping region In by using the difference in the RF spectrum. Because frequency multiplexed signals constituting the fluorescence beat group spectrum correspond one-to-one to a plurality of measurement points within two dimensions on the sample S, an image can be reconstructed from the fluorescence beat group spectrum.

In order to obtain a fluorescence beat group spectrum, it is important that a plurality of focal point regions C1 based on the first point light source 12A and a plurality of focal point regions C2 based on the second point light source 12B at least partially overlap each other. That is, it is important that the overlapping region In be formed. The size of the overlapping region In can be controlled by a focal length (fd) of the objective lens 38, the numerical aperture (NA) of the objective lens 38, each magnification (β) of the focusing optical system (focusing part 16), an adjacent frequency interval difference (mΔfr+fRF) between the first optical frequency comb spectrum LX1 and the second optical frequency comb spectrum LX2, a dispersion characteristic (K [rad/Hz]) of the dispersing element 32, and the like. The adjacent frequency interval difference (mΔfr+fRF) is vn1−vn2=(n1×fr1+f01)−(n2×fr2+f02)=δ [Hz].

A distance between the centers of the focal point regions C1 and C2 is d [m]. When the following relational expression (2) is satisfied, the two focal point regions C1 and C2 form the overlapping region In.

$$d \approx fd \cdot \beta K \cdot \delta \cdot Nm < 1.22 \lambda / NA \quad (2)$$

In the expression (2), λ≈c/(f01+Nm·fr1). f01 represents an offset frequency of the first optical frequency comb spectrum LX1.

It is preferable that an interval between the adjacent focal point regions C1 be larger than a size twice a spot size of each focal point region C1 in order to prevent the focal point regions C from overlapping at a plurality of locations. It is preferable that the interval between the adjacent focal point regions C2 be larger than a size twice a spot size of each focal point region C2 in order to prevent the focal point regions C from overlapping at a plurality of locations.

It is only necessary for the sample S to be any object that absorbs irradiated spectra (excitation light) MA1 and MA2 and emits fluorescence and the sample S is not limited to a specific object or the like. For example, living cells emit autofluorescence, fluorescence proteins, fluorescence beads, or the like can be used as the sample S.

The fluorescence generated at each measurement point on the sample S and propagated backward is incident on the focusing part 16 again. The light is collimated by the objective lens 38 of the focusing part 16 and commonly passes through the point P7. Subsequently, the light is incident on the relay lens 36 and is focused by the relay lens 36 at different positions in a direction orthogonal to the optical axis X (i.e., in the direction of the arrow D2 or D3 shown in FIG. 1). A plurality of light of fluorescence diverging after the focusing are collimated by the relay lens 34 and guided to the separating part 19. Similar to the fluorescence, reflected and scattered light from each point on the sample S is also incident on the focusing part 16 and is substantially converged and guided to the separating part 19.

Separating Part

The separating part 19 is disposed between the focusing part 16 and the spatial filtering optical system 18 in a direction along the optical axis X. The separating part 19 reflects only the fluorescence. Thus, the separating part 19 passes the light from the dispersing part 14 to the sample S, reflects the fluorescence emitted by the sample S, and guides the fluorescence to the spatial filtering optical system 18. The separating part 19 separates the reflected and scattered light from the sample S and the fluorescence emitted by the sample S.

For example, a dichroic mirror can be used for the separating part 19. The separating part 19 may be a combination of a half mirror and a fluorescent filter. The fluorescent filter blocks the reflected and scattered light from the sample S. After the reflected and scattered light from the sample S and the fluorescence emitted by the sample S are reflected by the half mirror in a predetermined direction, it is possible to pass only the fluorescence emitted by the sample S by causing the reflected and scattered light and the fluorescence to pass through the fluorescent filter.

Spatial Filtering Optical System

The spatial filtering optical system 18 is disposed between the separating part 19 and the detecting part 20 in the direction along the optical axis X. The spatial filtering optical system 18 causes light to be focused at a plurality of positions P3 conjugate to overlapping regions In where the focal point regions C1 and C2 of the spectra MA1 and MA2 on the sample S overlap. In the measurement device 10A, five positions including a focal position P1 of the first point light source 12A, a focal position P1 of the second point light source 12B, a position where the discrete spectral light LA and LB are focused between the relay lenses 34 and 36, focal positions p1, p2, . . . , pn where light is focused on the sample S, and a plurality of positions $P3_1$ to $P3_n$ conjugate to the overlapping regions In are conjugate to each other on the optical axis S.

The spatial filtering optical system 18 shown in FIG. 1 includes a focusing lens 40, a pinhole array element 42, and a collimating lens 44. The focusing lens 40, the pinhole array element 42, and the collimating lens 44 are disposed in that order in the optical axis X direction.

The focusing lens 40 focuses the fluorescence emitted from the sample S at the plurality of positions $P3_1$ to $P3_n$ conjugate to a plurality of overlapping regions In where the focal point regions C1 and C2 overlap on the sample S. Hereinafter, the above-described positions $P3_1$ to $P3_n$ may be simply referred to as the positions P3 conjugate to the overlapping regions In.

Figure 12:
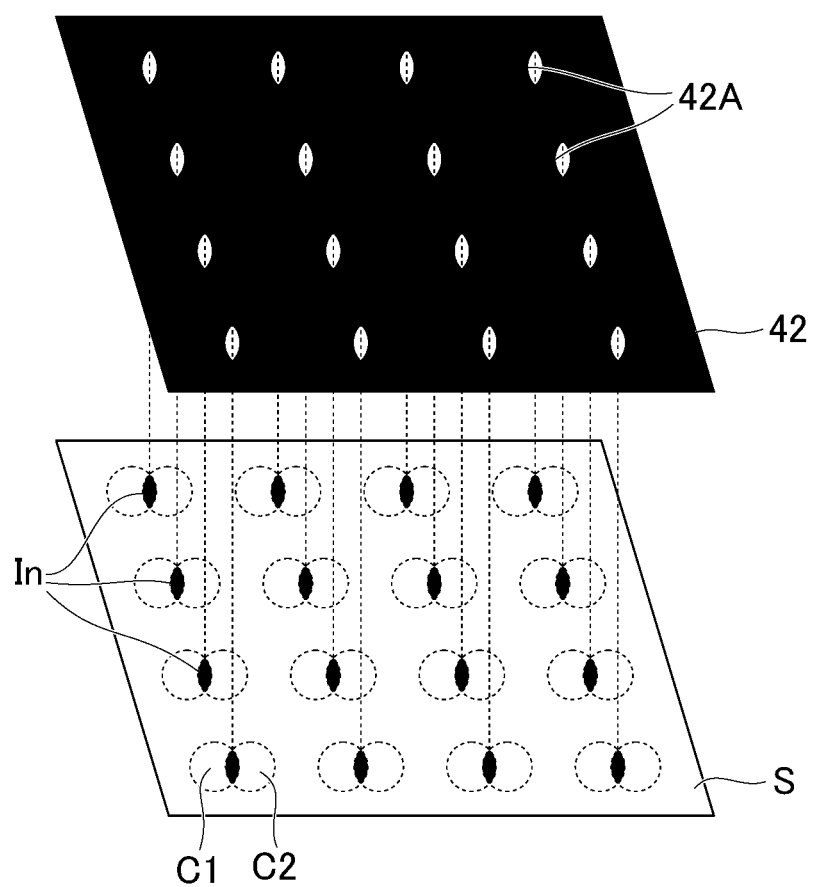
FIG. 12 is a diagram schematically showing a positional relationship between an overlapping region of focusing points on a sample and an aperture part of a pinhole array element.

A plurality of apertures having a predetermined size, shape, and interval is formed in the pinhole array element 42. In the direction along the optical axis X, the apertures formed in the pinhole array element 42 are located at the plurality of positions $P3_1$ to $P3_n$ conjugate to the plurality of overlapping regions In where the focal point regions C1 and C2 where light is focused by the focusing part 16 overlap. FIG. 12 is a diagram schematically showing a positional relationship between the overlapping region In of the sample S and the aperture formed in the pinhole array element 42. In FIG. 12, an optical system between the sample S and the pinhole array element 42 is omitted for ease of understanding of a corresponding relationship between the position of the sample S and the position of the pinhole array element 42.

As shown in FIG. 12, the pinhole array element 42 can pass only the fluorescence emitted in the overlapping region In. The size, shape, and interval of the aperture formed in the pinhole array element 42 are appropriately set in consideration of a frequency of the fluorescence spectrum emitted from the sample S, a shape and an interval of the overlapping region In, focusing performance of the focusing lens 40, and the like. The pinhole array element 42 passes only the fluorescence spectrum from the overlapping region In where the focal point regions C1 and C2 overlap within the fluorescence.

The pinhole array element 42 may be a fixed pinhole array element in which a plurality of apertures are two-dimensionally formed at predetermined positions, sizes, and shapes on a substrate made of a metal plate or the like. When the fixed pinhole array element is used, it is preferable to connect a configuration capable of three-dimensionally finely adjusting the position of the aperture formed in the fixed pinhole array element to the pinhole array element 42. Instead of various parameters of the pinhole array element 42, various parameters of the discrete spectral light (for example, the first adjacent frequency interval fr1, the second adjacent frequency interval fr2, and the offset frequencies f01 and f02) may be adjusted in the light source.

In order to provide high flexibility in adjusting the pinhole array element 42, a spatial light modulator capable of modulating the amplitude, phase, or polarization spatially and temporally may be used as the pinhole array element 42. Because the spatial light modulator can arbitrarily change the shape, position, and size of the aperture, only desired information from the sample S can be passed to the detecting part 20 by adjusting the shape, position, and size of the aperture in accordance with the change even when the condition of light emitted from the first point light source 12A or the second point light source 12B changes.

Adjustment of the pinhole array element 42 can be performed as follows. For example, before the actual observation of the sample S is started, a glass plate on which a fluorescent material is entirely coated is disposed instead of the sample S. The detecting part 20 detects a large number of point images formed by projecting the fluorescence generated from the glass plate onto the spatial light modulator. By making a section near the detected point image transparent, a spatial filter corresponding to the pinhole array element 42 can be implemented. For example, a two-dimensional focus distribution of two of the discrete spectral light LA and LB may be independently acquired in advance and an overlapping portion may be determined based on an overlapping state of the distribution.

A liquid crystal image display element having high-definition such as SXGA or XGA can be used for the spatial light modulator. A pixel onto which the fluorescent spot is projected can be determined by detecting a photocurrent generated in a TFT corresponding to the pixel. Through such a detection process, good spatial filter characteristics can be secured even if the optical axis is deviated due to environmental changes or the like.

The collimating lens 44 focuses the fluorescence spectra diverging from a plurality of positions $P3_1$ to $P3_n$ conjugate to the overlapping regions In. Accordingly, various parameters of the collimating lens 44 are appropriately set in consideration of a frequency of the fluorescence spectrum, distances between the plurality of positions $P3_1$ to $P3_n$ conjugate to the overlapping regions In and a position of the collimating lens 44, and are not limited to specific values. A focusing lens may be used as the collimating lens 44.

Detecting Part

The detecting part 20 is disposed on a rearmost part of the measurement device 10A in an X direction along the optical axis. The detecting part 20 acquires information of the sample S from at least a modulated signal based on a fluorescence spectrum including information of the sample S. In the first embodiment, the detecting part 20 acquires the information of the sample S from the modulated signal based on the fluorescence spectrum that is spatially filtered by the spatial filtering optical system 18 and includes the information of the sample S.

A conventional detector can be used as the detecting part 20. A fluorescence spectrum (a fluorescence beat) having a beat frequency in an overlapping region In where the focal point regions C1 and C2 overlap near the focal point is incident on the detecting part 20. The fluorescence spectrum at the beat frequency is obtained through the following steps. For example, a process of directly measuring a fluorescence spectrum in an RF spectrum analyzer and converting the fluorescence spectrum into a frequency scale of an original light region may be performed. Alternatively, a process of acquiring a temporal change in a fluorescence beat signal by a digitizer and performing a Fourier transform on the temporal change may be performed. In the step of performing the Fourier transform, as shown in FIG. 11, a fluorescence beat group spectrum FG, i.e., a frequency multiplexed signal corresponding to each pixel, is obtained. In the detecting part 20, the fluorescence having what degree of intensity has been emitted from what position in the sample S can be reconstructed from the frequency multiplexed signal for the detected fluorescence spectrum and a fluorescence image of the sample S can be observed.

Measurement Using Measurement Device 10A

Next, the principle of measurement using the measurement device 10A shown in FIG. 1 will be described.

The discrete spectral light LA and LB emitted from the discrete spectral light sources 22a and 22b of the two point light sources 12 is focused at the focal position P1 and passes through the aperture formed in the pinhole element 26. The discrete spectral light LA and LB diverging from the focal position P1 is collimated by the collimating lens 28 and is incident on the dispersing element 32 of the dispersing part 14.

Two or more (here, n) spectra MA1 and MA2 of the discrete spectral light LA and LB which forms a common angle $\theta 0$ with respect to the axis J3 and is incident on the dispersing element 32 are simultaneously dispersed at angles $\theta 1, \theta 2, \ldots, \theta n$ according to frequencies thereof for every spectra MA1 and MA2. That is, every spectra MA1 and MA2 disperse simultaneously in mutually different directions.

Subsequently, the n spectra MA1 and MA2 dispersed at different angles $\theta 1, \theta 2, \ldots, \theta n$ for each spectrum are incident on the focusing part 16. The n spectra MA1 and MA2 that have been incident thereon are focused for each spectrum by the relay lens 34 and collimated toward the point P7 by the relay lens 36. The n spectra MA1 and MA2 passing through the point P7 are simultaneously focused by the objective lens 38 at mutually different positions p1, p2, . . . , pn on the sample S.

The n spectra MA1 and MA2 are simultaneously focused in the focal point regions C at mutually different positions p1, p2, . . . , pn on the sample S. In each focal point region C, fluorescence emission by the spectrum MA1 and fluorescence emission by the spectrum MA2 occur. The fluorescence generated from each focal point region C has information at each point on the sample S. In the sample S, n overlapping regions In where the focal point region C1 of the spectrum MA1 and the focal point region C2 of the spectrum MA2 overlap each other are formed. In the n overlapping regions In, a fluorescence beat occurs due to interference light between the spectrum MA1 and the spectrum MA2.

Each fluorescence and each the reflected and scattered light from the focal point region C of the sample are collimated by the objective lens 38 of the focusing part 16 and pass through the point P7 in common. These lights are incident on the relay lens 36 and is focused by the relay lens 36 at different positions in a direction orthogonal to the optical axis X (i.e., the direction of the arrow D2 or D3 shown in FIG. 1). The light diverging after the focusing is collimated by the relay lens 34 and deflected toward the separating part 19.

The reflected and scattered light from the mutually different positions p1, p2, . . . , pn and the fluorescence generated at the mutually different positions p1, p2, . . . , pn are incident on the separating part 19. The separating part 19 separates the fluorescence from other light. That is, the separating part 19 removes components other than the fluorescence from the light incident on the separating part 19. The components other than the fluorescence mean a part of the excitation light reflected by the sample S. When the separating part 19 does not have wavelength selectivity, a beam splitter and a fluorescent filter may be used.

The fluorescence from the overlapping region In of each focal point region C is incident on the spatial filtering optical system 18 by the separating part 19. The fluorescence incident on the spatial filtering optical system 18 is focused by the focusing lens 40 at the plurality of positions $P3_1$ to $P3_n$ conjugate to the overlapping regions In of the focal point regions C. Further, the fluorescence passes through apertures in the pinhole array element 42 in which a plurality of apertures is formed. The aperture is formed in the pinhole array element 42 in corresponding position with an overlapping region In where the focal point region C1 of the spectrum MA1 and the focal point region C2 of the spectrum MA2 overlap each other. Thus, the pinhole array element 42 cuts out components in other than the focal point of the fluorescence in the overlapping region In. The components in other than the focal point of the fluorescence in the overlapping region In are components from outside the focal point of the overlapping region In and components of the non-overlapping regions C1 and C2 in the right diagram of FIG. 9, and are, for example, a component generated from an inner part of the sample in a depth direction and the like.

As shown in FIG. 11, the fluorescence from the overlapping region In is generated by an excitation light beat modulated in a beat frequency group corresponding to a frequency difference between the spectrum MA1 and the spectrum MA2 and has a modulation frequency (a beat frequency) differing according to each overlapping region In. That is, the pinhole array element 42 passes only a fluorescence spectrum of a predetermined beat frequency to which information at each point on the sample S is added. The n fluorescence spectra passing through the apertures of the pinhole array element 42 are collimated by the collimating lens 44 and are incident on the detecting part 20.

In the detecting part 20, n mode-resolved spectra corresponding to image pixels of the sample S can be acquired from fluorescence beat group signals including information of the image pixels of the sample S and modulated at different beat frequencies. Fluorescence modulated at the beat frequency is directly measured by, for example, an RF spectrum analyzer and converted to a frequency scale of the original optical region. The fluorescence modulated at the beat frequency may be obtained by acquiring a temporal change in a detected signal in a digitizer. By performing a Fourier transform on the acquired fluorescence, a mode-resolved spectrum (a fluorescence beat group spectrum FG) based on the fluorescence modulated at the beat frequency is obtained as shown in FIG. 11. Each spectrum of the n mode-resolved spectra corresponds to one overlapping region In in the focal point region C of the sample S and corresponds to one measurement point when a two-dimensional image is imaged from the fluorescence beat group spectrum FG.

Effects of Measurement Device 10A

Next, effects of the measurement device 10A according to the first embodiment will be described.

As shown in FIG. 9, the measurement device 10A according to the first embodiment can simultaneously focus the discrete spectral light LA and LB on mutually different focal points C on the sample S in one irradiation operation (i.e., one shot). Thereby, without scanning the laser beam, two or more of the n spectra MA1 and MA2 included in the discrete spectral light LA and LB can be simultaneously multi-dimensionally converted and mapped on a multi-dimensional plane.

Because the discrete spectral light LA and the discrete spectral light LB are independent of each other, the information of the sample S can be acquired as fluorescence emission simultaneously and in parallel at the focal positions p1, p2, . . . , pn of the n spectra MA1 and MA2 unlike a case in which continuous spectral light is used. Accordingly, if the focal point regions C of the spectra MA1 and MA2 are adjusted to a range of a measurement target of the sample S, information of the sample S in the measurement range can be obtained non-mechanically at a high speed.

According to the measurement device 10A of the first embodiment, the separating part 19 and the pinhole array element 42 can cut each component of a part of the excitation light reflected by the sample S and the fluorescence emission and detect only fluorescence having an optical beat spectrum from a position near the focal point of the overlapping region In which is a measurement target in the detecting part 20. The optical beat spectrum is caused due to the interference light between two light of the discrete spectral light LA and LB. The optical beat spectrum is downscaled from an optical frequency band (several hundred terahertz band) to the RF band (several kHz to several MHz band). That is, according to the measurement device 10A of the first embodiment, high-accuracy and high-speed measurement can be performed using a conventional RF measurement device.

The optical beat spectrum includes information of only the overlapping region In where the focal point region C1 of the spectrum MA1 and the focal point region C2 of the spectrum MA2 overlap each other. By appropriately adjusting and shaping a profile of a beam spot in the focal point region C1, the region occupied by the overlapping region In is made narrower than the region occupied by each of the focal point regions C1 and C2 and information of a smaller region can be obtained from the optical beat spectrum.

Each of the first adjacent frequency interval fr1 of the n spectra MA1 of the discrete spectral light LA emitted by the first point light source 12A of the measurement device 10A of the first embodiment and the second adjacent frequency intervals fr2 of the n spectra MA2 of the discrete spectral light LB emitted by the second point light source 12B is constant on the frequency. Thus, the n spectra MA1 and MA2 are focused at mutually different positions on the sample S with a constant interval therebetween. Accordingly, information within the measurement range of the sample S can be acquired at equally spaced intervals.

When the first optical frequency comb spectrum LX1 of the discrete spectral light LA emitted from the first point light source 12A and the second optical frequency comb spectrum LX2 of the discrete spectral light LB emitted from the second point light source 12B are arranged on the same frequency axis, a frequency interval (m$\Delta$fr+fRF) between the spectra MA1 and MA2 closest to each other on the frequency axis is represented by vn1−vn2=(n1×fr1+f01)(n2×fr2+f02). The frequency interval (m$\Delta$fr+fRF) is less than half (fr1/2) of the first adjacent frequency interval fr1 and half (fr2/2) of the second adjacent frequency interval. Thus, the first optical frequency comb spectrum LX1 and the second optical frequency comb spectrum LX2 interfere in the overlapping region In where the focal point region C1 and the focal point region C2 overlap each other. The interference light in the overlapping region In is modulated at a frequency corresponding to the frequency interval (m$\Delta$fr+fRF) between the closest spectra MA1 and MA2 on the frequency axis. Thereby, it is possible to obtain a fluorescence beat having a modulation frequency differing according to each of the overlapping regions In. That is, in the measurement device 10A according to the first embodiment, the fluorescence image can be directly reconstructed using the fluorescence beat group signal whose frequency interval has been downscaled.

In the measurement device 10A bringing the above-described effects, the high-speed performance and the high-resolution characteristics are significantly improved as compared with the conventional confocal fluorescence microscope and clear information of high contrast can be acquired with one shot of the discrete spectral light LA and LB. Thus, for example, it is possible to directly observe the movement of a molecule inside a living cell. As a result, it is conceivable that new knowledge related to the biotechnology field such as vital function analysis will be able to be acquired.

Second Embodiment

Figure 13:
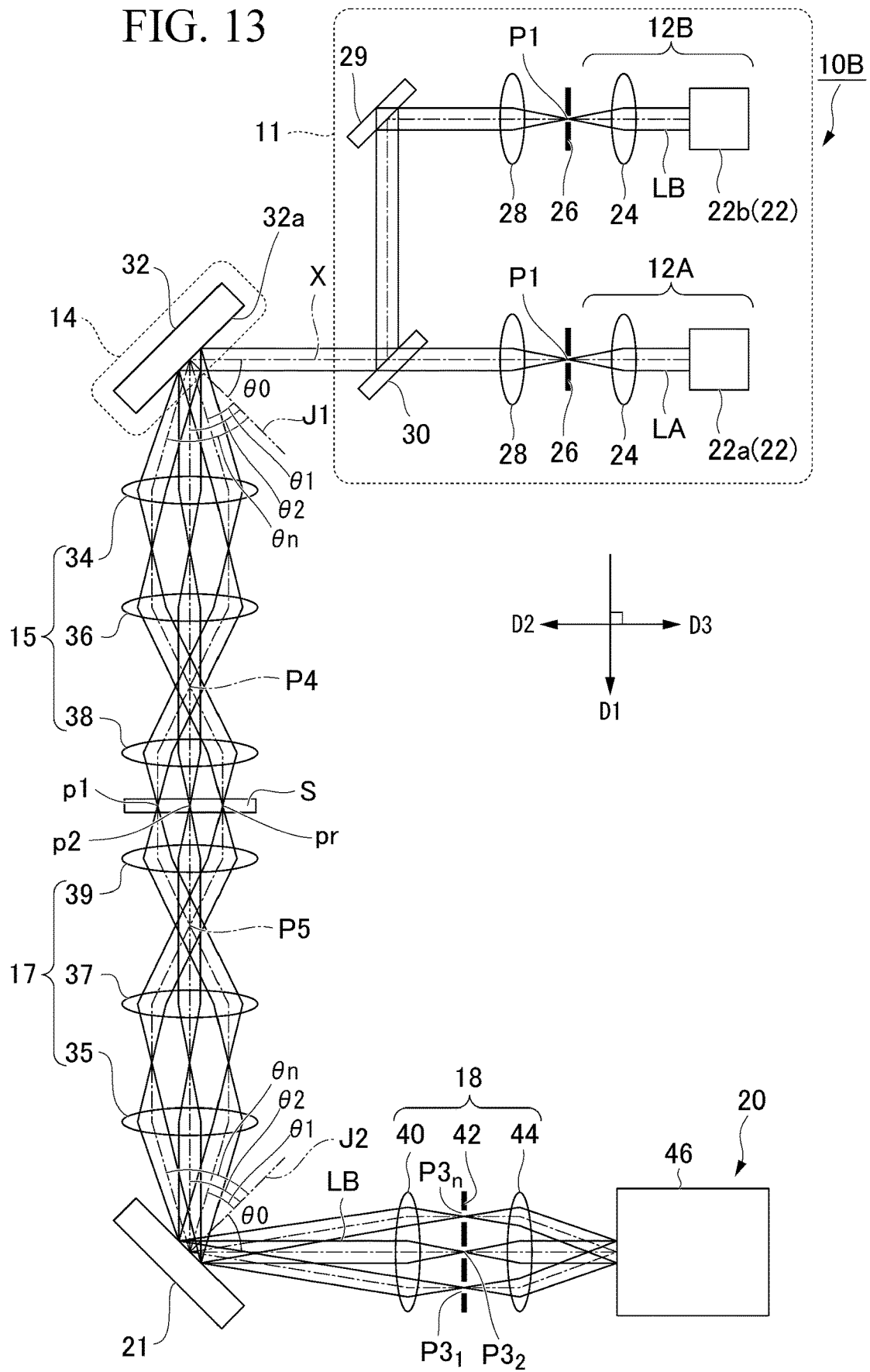
FIG. 13 is a schematic diagram of a measurement device according to a second embodiment.

FIG. 13 is a schematic diagram of a measurement device 10B according to a second embodiment. The measurement device 10B of the second embodiment is different from the measurement device 10A of the first embodiment in which fluorescence propagating backward is measured in that fluorescence propagating forward from a sample S is measured. Components of the measurement device 10B of the second embodiment shown in FIG. 13 that are the same as those of the measurement device 10A of the first embodiment shown in FIG. 1 are denoted by the same reference signs and description thereof will be omitted.

Configuration of Measurement Device 10B

As shown in FIG. 13, the measurement device 10B includes two point light sources 12, a dispersing part 14, a first focusing part 15, a second focusing part 17, a reflecting part 21, and a spatial filtering optical system 18, and a detecting part 20.

In the measurement device 10B, the second focusing part 17 is provided between the sample S and a reflecting part 21 in a direction along an optical axis X. The second focusing part 17 has a symmetric relation with the first focusing part 15 with respect to the sample S and the first focusing part 15 is configured to be folded with respect to the sample S.

The second focusing part 17 includes an objective lens 39 and relay lenses 35 and 37. The relay lenses 35 and 37 transfer a beam emission state of an entrance pupil (a point P5) of the objective lens to the reflecting part 21. The objective lens 39 and the relay lenses 35 and 37 correspond to the objective lens 38 and the relay lenses 34 and 36, respectively. The objective lens 39 collimates the spectra propagating forward from the mutually different positions p1, p2, . . . , pn, causes the spectra to pass through the point P5 in common, and causes the spectra to be incident on the relay lens 37. Hereinafter, spectra propagating forward from the positions p1, p2, . . . , pn are referred to as transmitted spectra. The relay lens 37 focuses a plurality of transmitted spectra passing through the point P5 at different positions in a direction orthogonal to the optical axis X (i.e., in a direction of an arrow D2 or D3 shown in FIG. 13). The relay lens 35 collimates a plurality of transmitted spectra diverging after the focusing. The configuration of the second focusing part 17 is not limited to the above-described configuration.

Measurement Using Measurement Device 10B

Next, the principle of measurement using the measurement device 10B shown in FIG. 13 will be described. Because the principle until the sample S is irradiated with discrete spectral light LA and LB emitted from the two point light sources 12 is similar to the principle of measurement using the measurement device 10A, the description of the principle until the sample S is irradiated with the discrete spectral light LA and LB will be omitted.

Information of the sample S at the positions p1, p2, . . . , pn is added to the n spectra MA1 and MA2 simultaneously focused at mutually different positions p1, p2, . . . , pn on the sample S. In this manner, n focal points C are simultaneously formed on the sample S in a single operation of irradiating the discrete spectral light LA and LB. The overlapping region In is formed in each of the focal point regions C. In the overlapping region In, the discrete spectral light LA and LB interfere and fluorescence modulated at the same frequency as interference light is generated. The information of the sample S is independently added to the fluorescence beat generated in each overlapping region In.

The discrete spectral light LA and LB and the fluorescence generated by the sample S propagate forward from mutually different positions p1, p2, . . . , pn and are incident on the second focusing part 17. The discrete spectral light beams LA and LB and the fluorescence from the n positions are respectively corrected for aberration or collimated by the objective lens 39 of the second focusing part 17 and pass through the point P5 in common. The fluorescence passing through the point P5 is incident on the relay lens 37 and is focused by the relay lens 37 at different positions in a direction orthogonal to the optical axis X (i.e., the direction of the arrow D2 or D3 shown in FIG. 13). The plurality of transmission spectra diverging after the focusing and the fluorescence from n positions are collimated by the relay lens 35 and deflected toward the reflecting part 21.

Fluorescence from the mutually different positions p1, p2, . . . , pn is reflected at a desired angle by the reflecting part 21.

n lights of fluorescence including the information of the sample S are incident on the spatial filtering optical system 18. The principle after the light is incident on the spatial filtering optical system 18 is similar to the principle of measurement using the measurement device 10A. Also, the fluorescence passing through the relay lens 37 may be directly incident on the spatial filtering optical system 18 without providing the relay lens 35 and the reflecting part 21.

Predetermined fluorescence from the pinhole array element 42 is fluorescence of n light beat spectra generated at the focal points of the overlapping region In and is incident on the detecting part 20. Thus, the detecting part 20 acquires n mode-resolved spectra corresponding to the fluorescence image pixels of the sample S from the optical beat spectrum including the information of the sample S.

Effects of Measurement Device 10B

According to the measurement device 10B according to the second embodiment, the effects similar to those of the measurement device 10A of the first embodiment can be obtained.

Third Embodiment

Figure 14:
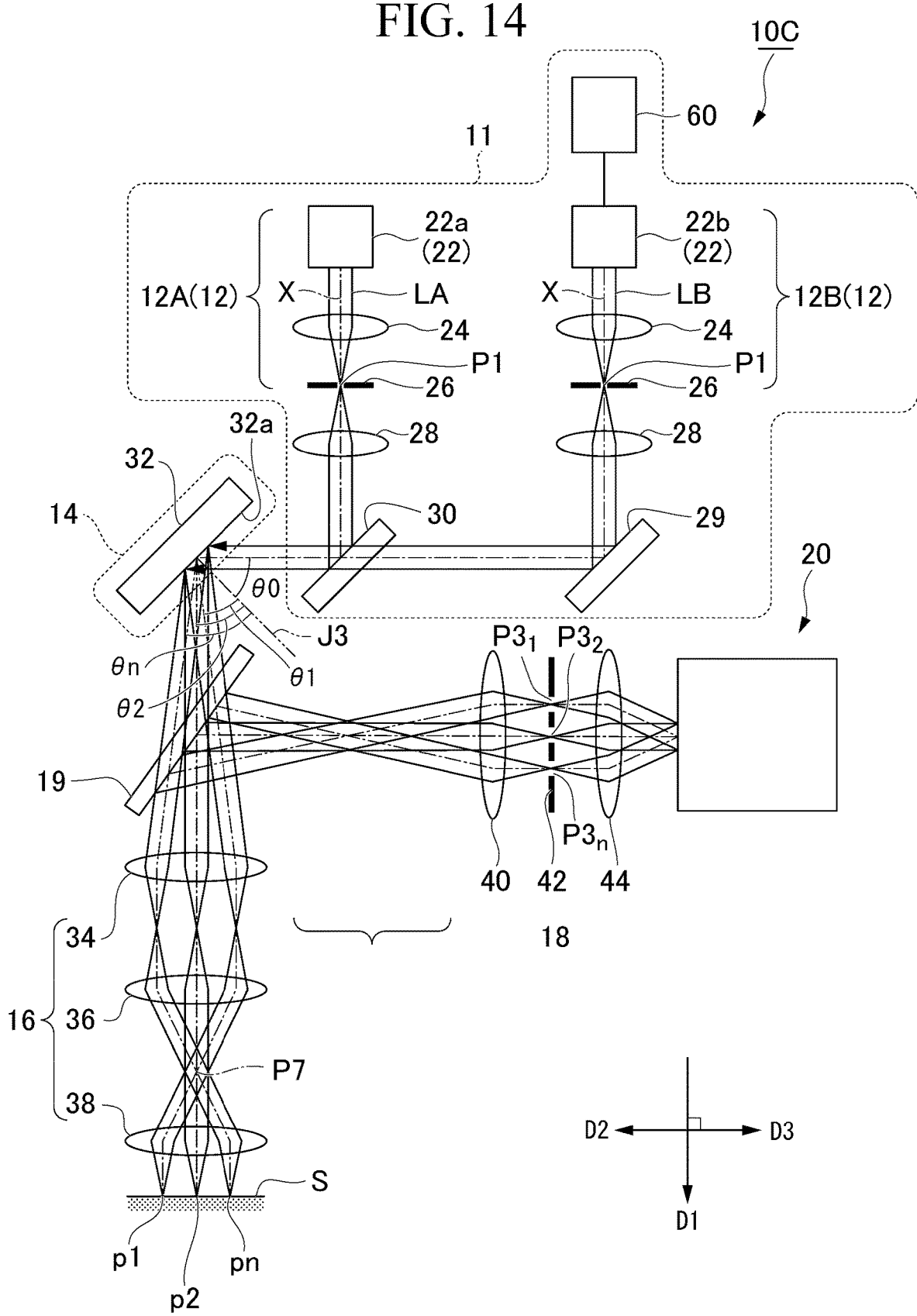
FIG. 14 is a schematic diagram of a measurement device according to a third embodiment.

FIG. 14 is a schematic diagram of a measurement device 10C according to the third embodiment. The measurement device 10C according to the third embodiment is different from the measurement device 10A according to the first embodiment in that the measurement device 10C has a control part 60 configured to control the offset frequency f02 or the adjacent frequency interval fr2 of discrete spectral light LB emitted by a second point light source 12B. Also, components that are the same as those of the measurement device 10A of the first embodiment shown in FIG. 1 among components of the measurement device 10C of the third embodiment shown in FIG. 14 are denoted by the same reference signs and description thereof will be omitted.

Configuration of Measurement Device 10C

As shown in FIG. 14, the measurement device 10C according to the third embodiment has a control part 60. The control part 60 controls the offset frequency f02 or the adjacent frequency interval fr2 of the discrete spectral light LB emitted by the second point light source 12B. Although the control part 60 is provided in the second point light source 12B in the configuration shown in FIG. 14, the control part 60 may be provided in the first point light source 12A or may be provided in both point light sources 12.

The control part 60 controls the offset frequency f02 or the adjacent frequency interval fr2 of the discrete spectral light LB. For example, the control part 60 controls intervals between pulses Φ1, Φ2, . . . , Φm of the discrete spectral light LB (see FIG. 2). When the control part 60 changes the offset frequency f02 or the adjacent frequency interval fr2 of the discrete spectral light LB, a degree of overlapping and an area of the overlapping region In in FIG. 9 change. When the offset frequency f02 or the adjacent frequency interval fr of each of the two point light sources 12 is changed by the control part 60, a position of a focusing point region C where light is focused on the sample S changes.

It is preferable that the spatial filtering optical system 18 in the measurement device 10C according to the third embodiment include a spatial light modulator capable of changing a position of transmitted light. When the position of the focal point region C changes, desired information is possible to be cut by spatial filtering in the fixed pinhole array element 42. If the spatial light modulator can arbitrarily change the position of transmitted light, an optical beat spectrum having a predetermined beat frequency to which information at each point on the sample S is added can be passed toward the detecting part 20.

Effects of Measurement Device 10C

When the control part 60 changes the offset frequency f02 or the adjacent frequency interval fr2 of the discrete spectral light LB and changes a degree of overlapping of the overlapping region In in an example shown in FIG. 9, a range in which the optical beat spectrum is obtained from the sample S changes. The measurement device 10C acquires information of the sample S obtained from the optical beat spectrum. Thus, the range in which the optical beat spectrum is obtained has a great influence on the resolution of the measurement device 10C. In other words, the resolution of the measurement device 10C can be changed by changing the degree of overlapping of the overlapping region In.

The optical beat spectrum is obtained from the overlapping part region In of the focal point regions C1 and C2 of the two point light sources 12. In other words, information of a portion on the sample S other than the overlapping region In cannot be measured. When the position of the focal point region C where light is focused on the sample S has been changed by the control part 60, the position of the focal point region C can be shifted as necessary to obtain information of a portion that has not been measured. The control part 60 can control the position of the focal point region C where light is focused on the sample S and obtain two images from information of two sets of information before the position of the focal point region C is shifted and information acquired at a position where the focal point region C has been shifted by about ¼ of an interval between the focal point regions C. After the two images are obtained, an image with increased resolution can be obtained if these images are calculated based on a general image processing algorithm.

In the measurement devices according to the above-described first to third embodiments, phase information of the fluorescence beat may be acquired. When the phase information of the fluorescence beat is acquired, information of a fluorescence lifetime other than an intensity of fluorescence can be extracted.

Figure 15:
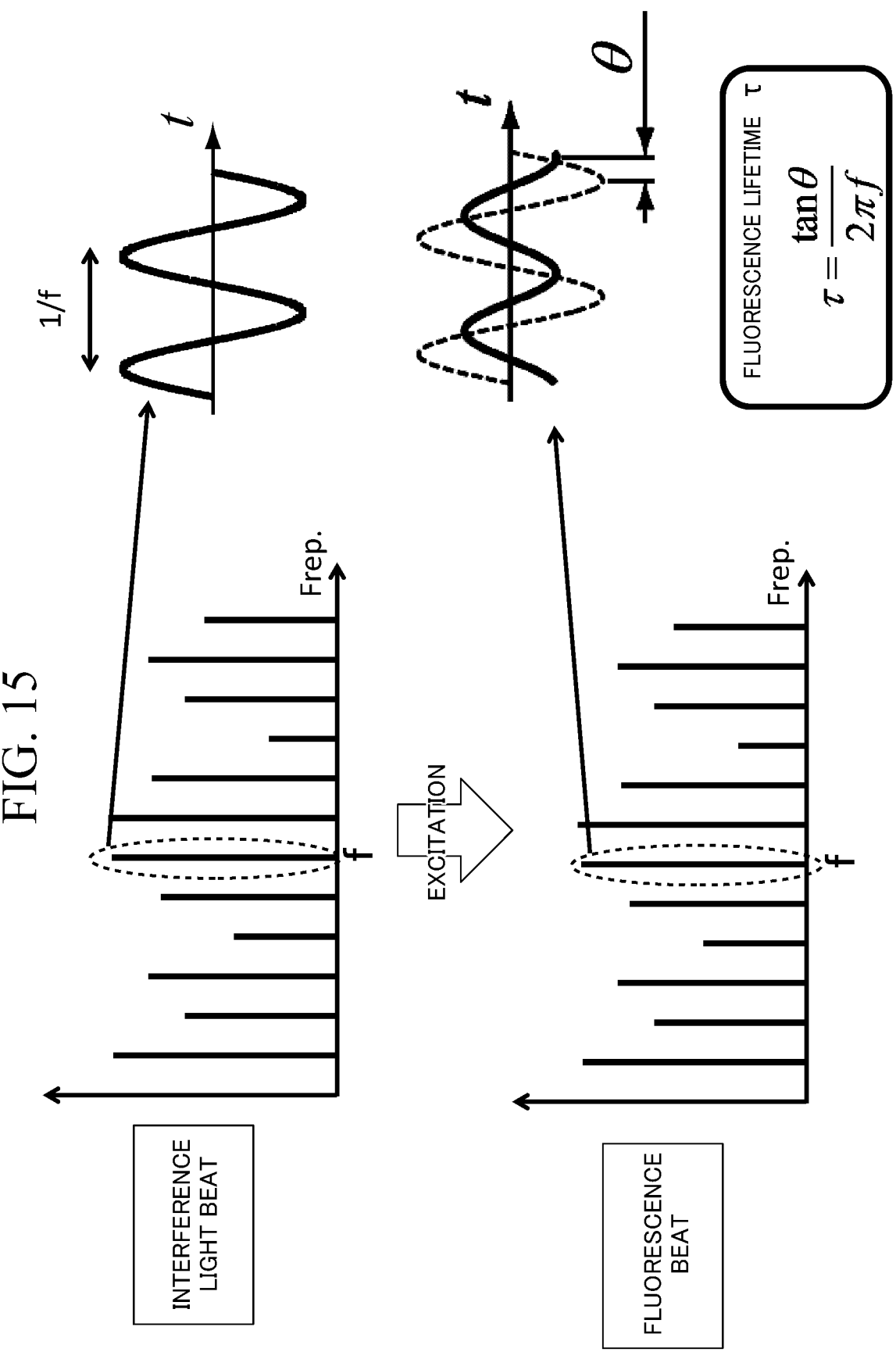
FIG. 15 is a schematic diagram illustrating a method of acquiring information about a fluorescence lifetime from phase information of an acquired fluorescence beat.

As shown in FIG. 15, the interference light beat and the fluorescence beat have the same RF spectrum. In FIG. 15, the frequency axis is shown as a Freq. axis. A time waveforms of a spectral components of the frequency f of both the interference light beat and the fluorescence beat have a period of 1/f. However, the fluorescence beat is shifted by a phase θ depending on a fluorescence generation process. A relationship between a delay of the phase θ and a fluorescence lifetime t is represented by the following Eq. (3).

$$\tau = \tan \theta / (2\pi f) \quad (3)$$

The interference light beat and the fluorescence beat can be measured simultaneously and a fluorescence lifetime image can be obtained from a phase difference distribution between the interference light beat and the fluorescence beat. When the fluorescence lifetime image is used, it is possible to perform highly sensitive detection of environmental changes around fluorescent molecules within cells, changes in a reaction speed of fluorescent molecules, and the like. Oxygen imaging and ion imaging of fluorescence and phosphorescence, imaging of interaction between proteins by fluorescence resonance energy transfer (FRET), and fluorescence correlation spectroscopy (FCS) become possible.

Although the preferred embodiments of the present invention have been described above in detail, the present invention is not limited to specific embodiments. That is, the above-described embodiments are only some of a large number of embodiments of the present invention. As long as the objectives, problem solving, or effects of the present invention can be achieved, it is obvious that various modifications and changes are possible in the measurement device and the irradiation device of the present invention even if they are not described in the above-described embodiments. In particular, a plurality of configurations or functions described in the above-described embodiments may be combined and can be changed (added or deleted).

Although the problem solving or objectives of the present invention have been generally described in "Technical Problem" in the present specification, the problem solving or objectives of the present invention is not limited to description details thereof. Needless to say, the problem solving or objectives described in the embodiments are valid for each invention. Also, the effects described in the embodiments are a reversal of the problem solving or the objective. Thus, even if the problem solving or the objectives are not directly described in the above-described embodiments, the existence thereof should be understood.

Also, although the inventions for achieving the problem solving or the objectives have been described in the measurement devices in the first to third embodiments among the above-described embodiments, a degree of achievement of the problem solving or the objectives is not necessarily 100%. The problem solving or the objectives of the present invention change in accordance with a combination of the configurations of the present invention. Needless to say, for example, even if the degree of achievement is 10%, the invention should not be denied as not achieving the objectives thereof.

For example, even if only a "leaf spring" is described as a certain configuration in the embodiment, for example, a "helical spring" can be assumed to be a "spring" within the scope of common technical knowledge. Thus, if a "spring" other than a "leaf spring" can achieve the objective of the present invention, it can be considered that the "spring" is described as a configuration of the present invention.

In each of the above embodiments, the first point light source 12A and the second point light source 12B have the focusing lens 24 individually. The pinhole element 26 and the collimating lens 28 are individually disposed in that order on the front side on the optical axis X with respect to the focusing lenses 24 of the first point light source 12A and the second point light source 12B. However, the focusing lenses 24 of the first point light source 12A and the second point light source 12B, and the pinhole elements 26 and the collimating lenses 28 corresponding to the first point light source 12A and the second point light source 12B may be shared.

Figure 16:
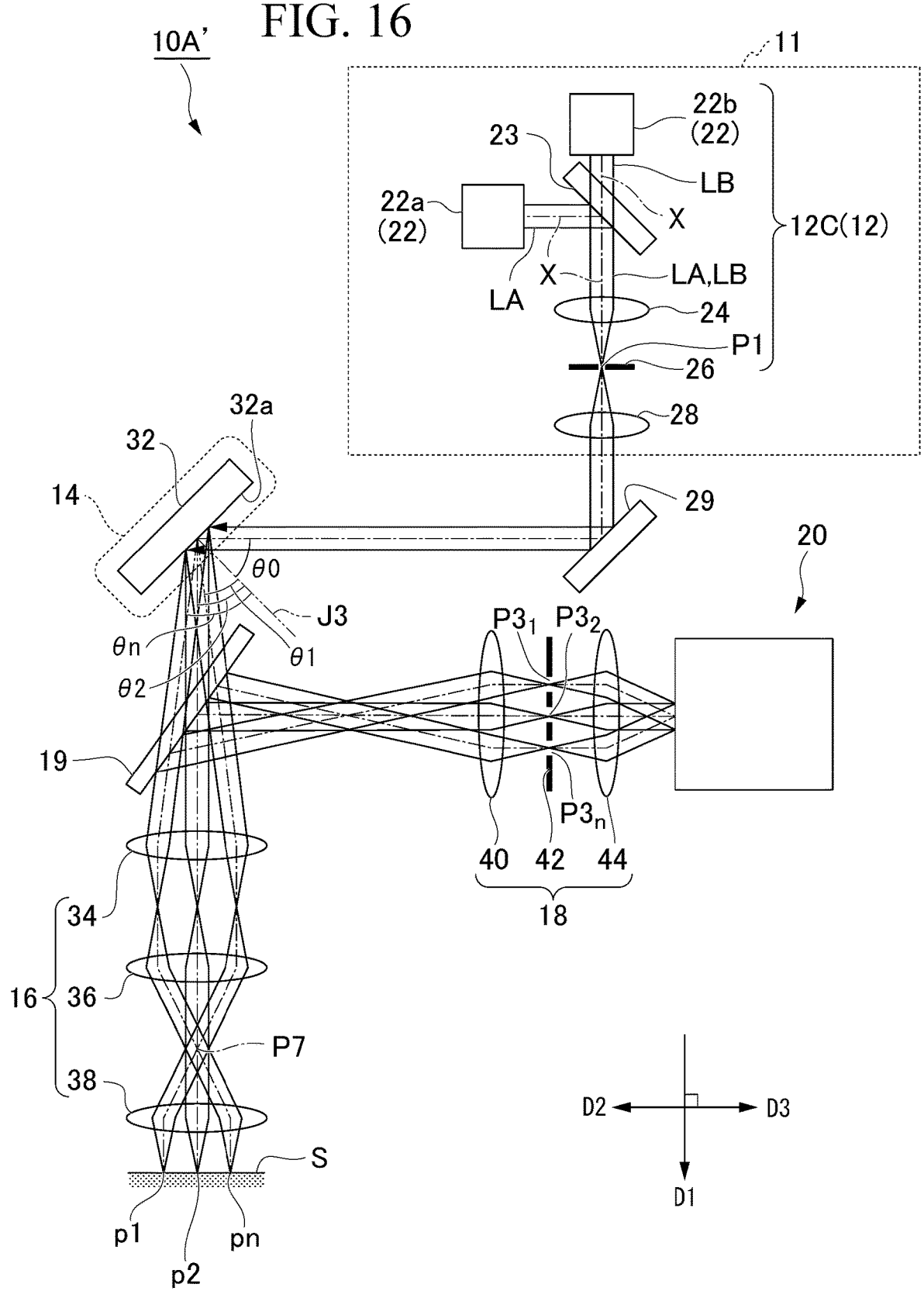
FIG. 16 is a schematic diagram showing a modified example of the measurement device according to the first embodiment.

For example, FIG. 16 shows a schematic diagram of a measurement device 10A' including a third point light source (a first point light source or a second point light source) 12C in which the focusing lens 24, the pinhole element 26, and the collimating lens 28 are shared on the optical axis X of the discrete spectral light source 22a or 22b in the measurement device 10A of the first embodiment. In the measurement device 10A', the half mirror 23 is disposed between the discrete spectral light source 22b and the focusing lens 24 on the optical axis X of the discrete spectral light LB emitted from the discrete spectral light source 22b. The discrete spectral light source 22a is disposed at a position where the discrete spectral light source 22b is folded with respect to a reflection surface of the half mirror 23. The discrete spectral light LA emitted from the discrete spectral light source 22a and the discrete spectral light LB emitted from the discrete spectral light source 22b are combined by the half mirror 23 and pass through the focusing lens 24, the pinhole element 26, and the collimating lens 28 that are shared.

In the measurement device 10A, there are five positions conjugate to each other as described above. In the measurement device 10A', four positions including one focusing position P1, a position where the discrete spectral light LA and LB are focused between the relay lenses 34 and 36, positions p1, p2, . . . , pn where the light is focused on the sample S, and a plurality of positions P3$_1$ to P3$_n$ conjugate to the overlapping regions In are conjugate to each other on the optical axis X. By sharing the focusing lens 24, the pinhole element 26, and the collimating lens 28 on the optical axis X of the discrete spectral light source 22a or 22b, the measurement device 10A' has four positions conjugate to each other. In the measurement device 10A', the alignment of the focal points of the discrete spectral light sources 22a and 22b, which is performed by the measurement device 10A, is not required, and confocal characteristics are improved and handling is facilitated. Also, according to the measurement device 10A', the number of components of the light emitting part 11 can be reduced, and the size of the entire device can be reduced.

In the above-described embodiments, the light emitting part 11 includes the first point light source 12A and the second point light source 12B. However, it is only necessary for the light emitting part 11 to emit the discrete spectral light LA and LB having different adjacent frequency intervals toward the dispersing part 14, and the two light sources need not necessarily be provided. For example, the light emitting part 11 may include only one optical frequency comb source having a configuration of a loop-type resonator or another configuration. Within the configuration of the loop-type resonator, the laser light is amplified while the laser light is propagating clockwise and counterclockwise. In the configuration of the loop-type resonator, light having two mutually different wavelengths may be amplified while the light is propagating. Within the configuration of loop-type resonator, two polarized light orthogonal to each other may be amplified while the polarized light is propagating. When an intensity of the laser light becomes greater than a predetermined intensity, discrete spectral light LA and LB is emitted from the configuration resonator. The discrete spectral light LA and LB emitted from the optical frequency comb source can propagate in the same direction and can be incident on the dispersing part 14. By configuring the light emitting part 11 in a single optical frequency comb source as described above, the size and cost of the light emitting part 11 can be reduced.

In each of the above-described embodiments, the measurement device includes the spatial filtering optical system 18 and therefore it is possible to acquire information about the sample S at any position with high resolution in the direction along the optical axis X, i.e., in the thickness direction of the sample S, when the sample S has a thickness as in a cell or the like. However, when it is only necessary to obtain information of only a position where a reagent is added to the sample S in the direction along the optical axis X or when phase information of a fluorescence beat is acquired, the spatial filtering optical system 18 can be omitted.

In view of the fact that the measurement device can be changed as described above, it is only necessary for the measurement device of the present invention to include at least the light emitting part 11, the dispersing part 14, the focusing part 16 or the first focusing part 15, and the detecting part 20. The light emitting part 11 emits a plurality of spectral light including two or more spectra distributed at mutually different frequencies. Adjacent frequency intervals are different in each of the plurality of spectral lights. It is only necessary for the light emitting part 11 to emit a plurality of spectral lights and the light emitting part 11 need not necessarily be a light source. The light emitting part 11 may be a splitting part associated with another measurement device in a configuration in which a plurality of spectral light are split from another measurement device and emitted to the measurement device of the present invention. The detecting part 20 acquires a signal of a fluorescence beat that emits light due to the interference light beat in each of the plurality of overlapping regions In and includes information of the sample S.

LISTING OF REFERENCE NUMERALS 10A, 10A', 10B, 10C: Measurement devices.
11: Light emitting part.
14: Dispersing part.
15: First focusing part.
16: Focusing part.
17: Second focusing part.
19: Separating part.
18: Spatial filtering optical system (spatial filtering part).
20: Detecting part.
12: Point light source (light source).
32: Dispersing element.
LA, LB: Discrete spectral light.
p1, p2, . . . , pn: Different positions on sample and focusing positions on sample.
P3: Conjugate position.
S: Sample.

What is claimed is:

1. A measurement device, comprising:
a plurality of light sources configured to each emit spectral light including two or more spectra distributed at mutually different frequencies, wherein adjacent frequency intervals that are frequency intervals of adjacent spectra of the spectral light are mutually different;
a dispersing part configured to disperse a plurality of spectral lights emitted from the plurality of light sources in mutually different directions according to each spectrum;
a focusing part configured to focus the spectra specific to the light sources dispersed by the dispersing part at a plurality of different focal points on a sample and cause a plurality of focal points based on one light source to overlap a plurality of focal points based on another light source;
a spatial filtering part configured to focus fluorescence beats including information of the sample on which light is focused by the focusing part and which emits light by interference light beats in each of a plurality of overlapping portions where the focal points on the sample overlap at positions conjugate to the overlapping portions and perform spatial filtering on the fluorescence beats; and
a detecting part configured to acquire a signal of the fluorescence beats on which the spatial filtering has been performed by the spatial filtering part and which has been emitted from the plurality of overlapping portions including the information of the sample.

2. The measurement device according to claim 1, wherein each of the plurality of light sources is an optical frequency comb light source configured to emit spectra in which adjacent frequency intervals which are intervals of frequencies of the spectra adjacent on a frequency axis are equal to each other as the spectral light.

3. The measurement device according to claim 1,
wherein the dispersing part includes a dispersing element configured to perform wavelength dispersion on incident light, and
wherein the dispersing part performs wavelength dispersion on the spectral light emitted from the light source by the dispersing element in a direction differing according to each spectrum.

4. The measurement device according to claim 1,
wherein the plurality of light sources include at least a first light source configured to emit first spectral light in which a frequency interval of the adjacent spectrum is a first adjacent frequency interval and a second light source configured to emit second spectral light in which a frequency interval of the adjacent spectrum is a second adjacent frequency interval, and
wherein a frequency interval between closest adjacent spectra is less than half of the first adjacent frequency interval and half of the second adjacent frequency interval when the first spectral light and the second spectral light are arranged on the same frequency axis.

5. The measurement device according to claim 1, further comprising a control part configured to control a carrier envelope offset frequency or an adjacent frequency interval of spectral light emitted by at least one light source of the plurality of light sources.

6. The measurement device according to claim 5, wherein the spatial filtering part comprises a spatial optical modulator capable of changing a position or a shape of light to be transmitted in accordance with the offset frequency and the adjacent frequency interval of the spectral light controlled by the control part.

7. An irradiation device, comprising:
a plurality of light sources configured to each emit spectral light including two or more spectra distributed at mutually different frequencies, wherein adjacent frequency intervals that are frequency intervals of adjacent spectra of the spectral light are mutually different;
a dispersing part configured to disperse a plurality of the spectral lights emitted from the plurality of light sources in mutually different directions according to each spectrum; and
a focusing part configured to focus the spectra specific to the light sources dispersed by the dispersing part at a plurality of different focal points on a sample and cause a plurality of focal points according to one light source to overlap a plurality of focal points according to another light source.

8. The irradiation device according to claim 7,
wherein the plurality of light sources include at least a first light source configured to emit first spectral light in which a frequency interval of the adjacent spectrum is a first adjacent frequency interval and a second light source configured to emit second spectral light in which a frequency interval of the adjacent spectrum is a second adjacent frequency interval, and
wherein a frequency interval between closest adjacent spectra is less than half of the first adjacent frequency interval and half of the second adjacent frequency interval when the first spectral light and the second spectral light are arranged on the same frequency axis.

9. The irradiation device according to claim 7,
wherein the plurality of light sources simultaneously irradiate irradiation light to focal points on a sample, and
wherein the irradiation light from the light sources mutually interferes at the focal points on the sample.

10. An irradiation device, comprising:
a first light source configured to emit first light having frequency components of a plurality of frequency values which are discrete;
a second light source configured to emit second light having frequency components of a plurality of frequency values which are discrete and different from the first light; and
a dispersing and focusing part configured to disperse the first light and the second light and focus the first irradiation light and the second irradiation light so that parts of both a first irradiation region of first irradiation light having a frequency component of a first frequency value according to the first light and a second irradiation region of second irradiation light having a frequency component of a second frequency value according to the second light overlap,
wherein the first irradiation light and the second irradiation light are simultaneously irradiated so that a difference between the first frequency value and the second frequency value is less than or equal to a difference between the first frequency value of the first light and a frequency value adjacent thereto.

11. A measurement device, comprising:
a light emitting part configured to emit a plurality of spectral lights each including two or more spectra distributed at mutually different frequencies, wherein adjacent frequency intervals that are frequency intervals of adjacent spectra in each of the plurality of the spectral lights are mutually different;
a dispersing part configured to disperse the plurality of the spectral lights emitted from the light emitting part in mutually different directions according to each spectrum;
a focusing part configured to focus the spectra dispersed by the dispersing part at a plurality of different focal points on a sample and cause a plurality of focal points based on one of the spectral lights to overlap a plurality of focal points based on another of the spectral lights; and
a detecting part configured to acquire a signal of fluorescence beats including information of the sample on which light is focused by the focusing part and which emits light by interference light beats in each of a plurality of overlapping regions where the focal points on the sample overlap.

12. The measurement device according to claim 11, wherein the light emitting part has a plurality of light sources configured to each emit two of the spectral lights having the adjacent frequency intervals which are mutually different.

13. The measurement device according to claim 11, further comprising a spatial filtering part configured to focus fluorescence beats including information of the sample on which light is focused by the focusing part and which emits light by interference light beats in each of a plurality of overlapping regions where the focal points on the sample overlap at positions conjugate to the overlapping regions and perform spatial filtering on the fluorescence beats,
wherein the detecting part acquires a signal of the fluorescence beats on which the spatial filtering has been performed in the spatial filtering part.

14. The measurement device according to claim 1 or 11, wherein the detecting part acquires phase information of the fluorescence beats.

15. An irradiation device, comprising:
a light emitting part configured to emit spectral light including two or more spectra distributed at mutually different frequencies, wherein adjacent frequency intervals that are frequency intervals of adjacent spectra of the spectral light are mutually different;

a dispersing part configured to disperse a plurality of spectral lights emitted from the light emitting part in mutually different directions according to each spectrum; and a focusing part configured to focus the spectra specific to light sources dispersed by the dispersing part at a plurality of different focal points on a sample and cause a plurality of focal points based on one light source to overlap a plurality of focal points based on another light source.

16. A measurement device, comprising:

a plurality of light sources configured to each emit spectral light including two or more spectra distributed at mutually different frequencies, wherein adjacent frequency intervals that are frequency intervals of adjacent spectra of the spectral light are mutually different;

a dispersing part configured to disperse a plurality of spectral lights emitted from the plurality of light sources in mutually different directions according to each spectrum;

a focusing part configured to focus the spectra specific to the light sources dispersed by the dispersing part at a plurality of different focal points on a sample and cause a plurality of focal points based on one light source to overlap a plurality of focal points based on another light source;

a detecting part configured to acquire a signal of the fluorescence beats including information of the sample on which light is focused by the focusing part and which emits light by interference light beats in each of a plurality of overlapping portions where the focal points on the sample overlap.

* * * * *